US012763720B2

(12) United States Patent
Patton et al.

(10) Patent No.: US 12,763,720 B2
(45) **Date of Patent: *Oct. 13, 2026**

(54) METHODS FOR ATTACHING SOLAR PANELS TO FRAMEWORKS

(71) Applicant: NEXTPOWER LLC, Fremont, CA (US)

(72) Inventors: John C. Patton, Rocklin, CA (US); Eric L. Hafter, Sacramento, CA (US)

(73) Assignee: NEXTPOWER LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,351

(22) Filed: Jul. 11, 2025

(65) Prior Publication Data

US 2025/0343504 A1 Nov. 6, 2025

Related U.S. Application Data

(63) Continuation of application No. 18/634,614, filed on Apr. 12, 2024, which is a continuation of application No. 17/618,260, filed as application No. PCT/US2020/037092 on Jun. 10, 2020, now Pat. No. 11,996,802.

(60) Provisional application No. 62/921,310, filed on Jun. 10, 2019.

(51) Int. Cl.

| | |
|---|---|
| ***H02S 30/20*** | (2014.01) |
| ***F24S 25/20*** | (2018.01) |
| ***H02S 30/10*** | (2014.01) |

(52) U.S. Cl.

CPC .............. *H02S 30/20* (2014.12); *F24S 25/20* (2018.05); *H02S 30/10* (2014.12)

(58) Field of Classification Search

None

See application file for complete search history.

(56) References Cited

U.S. PATENT DOCUMENTS

| | | |
|---|---|---|
| 1,826,133 A | 10/1931 | Hatch |
| 2,105,706 A | 1/1938 | Stamy |
| 2,201,335 A | 5/1940 | Bart |

(Continued)

FOREIGN PATENT DOCUMENTS

| | | |
|---|---|---|
| CN | 200989673 Y | 12/2001 |
| CN | 102569465 A | 7/2012 |

(Continued)

OTHER PUBLICATIONS

U.S. Appl. No. 62/921,310, filed Jun. 10, 2019. First named inventor: Patton.

(Continued)

*Primary Examiner* — Jacob J Cigna

(74) *Attorney, Agent, or Firm* — Fredrikson & Byron, P.A.

(57) ABSTRACT

Embodiments of the present invention may provide an elongated single piece of framework (59) which may be bent around a corner (46) perhaps for form an about 90 degree angle (61). An elongated single piece of framework (59) may have a first end (49) and a second end (50) which may be joined to each other or may be joined to other ends of a separate framework. A partial frame (48) or even a rectangular panel framework (3) may be created from at least one of an elongated single piece of framework which may frame a solar panel.

20 Claims, 27 Drawing Sheets

(56) References Cited

U.S. PATENT DOCUMENTS

| | | | |
|---|---|---|---|
| 2,598,776 A | 6/1952 | Flora | |
| 2,689,027 A | 9/1954 | Flora | |
| 3,685,863 A | 8/1972 | Oetiker | |
| 4,047,349 A | 9/1977 | Aguilar, Jr. et al. | |
| 4,111,188 A | 9/1978 | Murphy, Jr. | |
| 4,112,693 A | 9/1978 | Collin | |
| 4,371,139 A | 2/1983 | Clark | |
| 4,421,943 A | 12/1983 | Withjack | |
| 4,429,872 A | 2/1984 | Capachi | |
| 4,479,737 A | 10/1984 | Bergh et al. | |
| 4,744,187 A | 5/1988 | Tripp | |
| 4,760,981 A | 8/1988 | Hodges et al. | |
| 4,763,456 A | 8/1988 | Gianuzzi | |
| 4,896,992 A | 1/1990 | Muhlethaler | |
| 4,945,699 A | 8/1990 | Murphy | |
| 4,966,631 A | 10/1990 | Matlin et al. | |
| 5,076,035 A | 12/1991 | Wright | |
| 5,102,275 A | 4/1992 | Hulsey | |
| 5,143,556 A | 9/1992 | Matlin | |
| 5,164,020 A | 11/1992 | Wagner et al. | |
| 5,184,792 A | 2/1993 | Bernhard et al. | |
| 5,228,644 A | 7/1993 | Garriott et al. | |
| 5,255,887 A | 10/1993 | Schumacher et al. | |
| 5,289,356 A | 2/1994 | Winston | |
| 5,344,496 A | 9/1994 | Stern et al. | |
| 5,497,587 A | 3/1996 | Hirai et al. | |
| 5,505,788 A | 4/1996 | Dinwoodie | |
| 5,537,991 A | 7/1996 | Winston et al. | |
| 5,571,338 A | 11/1996 | Kadonome et al. | |
| 5,706,617 A | 1/1998 | Hirai et al. | |
| 5,746,029 A | 5/1998 | Ullman | |
| 5,746,839 A | 5/1998 | Dinwoodie | |
| 5,930,969 A | 8/1999 | Mayle | |
| 6,058,930 A | 5/2000 | Shingleton | |
| 6,093,884 A | 7/2000 | Toyomura et al. | |
| 6,111,189 A | 8/2000 | Garvison et al. | |
| 6,134,754 A | 10/2000 | Hansson et al. | |
| 6,201,180 B1 | 3/2001 | Meyer et al. | |
| 6,207,889 B1 | 3/2001 | Toyomura et al. | |
| 6,233,889 B1 | 5/2001 | Hulsey | |
| 6,250,034 B1 | 6/2001 | Hulsey | |
| 6,269,596 B1 | 8/2001 | Ohtsuka et al. | |
| 6,282,857 B1 | 9/2001 | Rubenacker | |
| 6,360,491 B1 | 3/2002 | Ullman | |
| 6,405,494 B1 | 6/2002 | Wismeth | |
| 6,465,724 B1 | 10/2002 | Garvison et al. | |
| 6,467,916 B2 | 10/2002 | Winston | |
| 6,489,566 B1 | 12/2002 | Durin et al. | |
| 6,501,013 B1 | 12/2002 | Dinwoodie | |
| 6,501,020 B2 | 12/2002 | Grant et al. | |
| 6,526,701 B2 | 3/2003 | Stearns et al. | |
| 6,534,703 B2 | 3/2003 | Dinwoodie | |
| 6,670,541 B2 | 12/2003 | Negao et al. | |
| 6,672,018 B2 | 1/2004 | Shingleton | |
| 6,745,869 B2 | 6/2004 | Garrett | |
| 6,784,360 B2 | 8/2004 | Nakajima et al. | |
| 6,809,251 B2 | 10/2004 | Dinwoodie | |
| D510,315 S | 10/2005 | Shugar | |
| 6,958,868 B1 | 10/2005 | Pender | |
| 6,959,517 B2 | 11/2005 | Poddany et al. | |
| 6,987,604 B2 | 1/2006 | Rabinowitz et al. | |
| RE38,988 E | 2/2006 | Dinwoodie | |
| D519,444 S | 4/2006 | Mascolo | |
| 7,043,884 B2 | 5/2006 | Moreno | |
| 7,156,088 B2 | 1/2007 | Luconi | |
| 7,297,866 B2 | 11/2007 | Aschenbrenner | |
| D565,505 S | 4/2008 | Shugar | |
| 7,386,922 B1 | 6/2008 | Taylor et al. | |
| 7,388,146 B2 | 6/2008 | Fraas et al. | |
| 7,406,800 B2 | 8/2008 | Cinnamon et al. | |
| 7,413,392 B2 | 8/2008 | Nebesnak | |
| 7,475,513 B2 | 1/2009 | Parker | |
| 7,631,468 B2 | 12/2009 | Gong | |
| 7,935,202 B2 | 5/2011 | Stanley | |
| 8,099,922 B2 | 1/2012 | Kellerman et al. | |
| 8,122,648 B1 | 2/2012 | Liu | |
| 8,166,720 B2 | 5/2012 | Garrigus | |
| 8,250,829 B2 | 8/2012 | McPheeters | |
| 8,307,606 B1 | 11/2012 | Rego et al. | |
| 8,316,617 B2 | 11/2012 | Krovats | |
| 8,316,618 B1 | 11/2012 | Rodowca et al. | |
| 8,316,619 B1 | 11/2012 | Rego et al. | |
| 8,336,227 B2 | 12/2012 | Bae et al. | |
| 8,371,076 B2 | 2/2013 | Jones et al. | |
| 8,438,893 B2 | 5/2013 | Durney et al. | |
| 8,443,558 B2 | 5/2013 | Buller et al. | |
| 8,495,997 B1 | 7/2013 | Laubach et al. | |
| 8,505,248 B1 | 8/2013 | Leong et al. | |
| 8,522,490 B1 | 9/2013 | Stancel | |
| 8,522,491 B2 | 9/2013 | Kneip | |
| 8,536,442 B2 | 9/2013 | Stancel | |
| 8,549,800 B2 | 10/2013 | Reyal et al. | |
| 8,623,158 B2 | 1/2014 | Stanley | |
| 8,631,614 B2 | 1/2014 | Livsey | |
| 8,683,751 B2 | 4/2014 | Stearns et al. | |
| 8,733,718 B2 | 5/2014 | Corsi | |
| 8,752,343 B2 | 6/2014 | Kuan | |
| 8,782,983 B2 | 7/2014 | Stearns | |
| 8,826,618 B2 | 9/2014 | Stearns | |
| 8,870,130 B2 | 10/2014 | Eul | |
| 9,109,814 B2 | 8/2015 | Patton et al. | |
| 9,188,365 B2 | 11/2015 | Kuan et al. | |
| 9,353,546 B2 | 5/2016 | Garza et al. | |
| 9,479,110 B2 | 10/2016 | Patton et al. | |
| 9,512,617 B2 | 12/2016 | Powers, III | |
| 9,876,465 B2 | 1/2018 | Depauw | |
| 9,906,186 B2 | 2/2018 | Suzuki | |
| 9,998,066 B2 | 6/2018 | West et al. | |
| 10,158,323 B2 | 12/2018 | Schulte et al. | |
| 10,256,768 B2 | 4/2019 | Owen et al. | |
| 10,631,472 B2 | 4/2020 | Clarke et al. | |
| 10,651,783 B2 | 5/2020 | Molitor et al. | |
| 10,931,225 B2 | 2/2021 | Yang et al. | |
| 11,118,721 B1 | 9/2021 | Schmitt et al. | |
| 11,996,802 B2 * | 5/2024 | Patton | H02S 30/00 |
| 2002/0066235 A1 | 6/2002 | Stearns et al. | |
| 2002/0096395 A1 | 7/2002 | Garret | |
| 2003/0015637 A1 | 1/2003 | Liebendorfer | |
| 2003/0033780 A1 | 2/2003 | Hasan | |
| 2003/0070368 A1 | 4/2003 | Shingleton | |
| 2003/0230451 A1 | 12/2003 | Garrett | |
| 2004/0007260 A1 | 1/2004 | Dinwoodie | |
| 2004/0148888 A1 | 8/2004 | Kuhn | |
| 2004/0163338 A1 | 8/2004 | Liebendorfer | |
| 2004/0261955 A1 | 12/2004 | Singleton et al. | |
| 2005/0144870 A1 | 7/2005 | Dinwoodie | |
| 2006/0054212 A1 | 3/2006 | Fraas et al. | |
| 2006/0185289 A1 | 8/2006 | Gong | |
| 2007/0102036 A1 | 5/2007 | Cinnamon | |
| 2007/0144575 A1 | 6/2007 | Mascolo et al. | |
| 2007/0151594 A1 | 7/2007 | Mascolo et al. | |
| 2007/0157963 A1 | 7/2007 | Metten et al. | |
| 2007/0272234 A1 | 11/2007 | Allen et al. | |
| 2007/0295392 A1 | 12/2007 | Cinnamon | |
| 2007/0295393 A1 | 12/2007 | Cinnamon | |
| 2008/0105489 A1 | 5/2008 | Garrett | |
| 2008/0121273 A1 | 5/2008 | Plaisted | |
| 2008/0152849 A1 | 6/2008 | Lenhardt | |
| 2008/0302407 A1 | 12/2008 | Kobayashi | |
| 2009/0050194 A1 | 2/2009 | Noble et al. | |
| 2009/0078299 A1 | 3/2009 | Cinnamon et al. | |
| 2009/0114271 A1 | 5/2009 | Stancel | |
| 2009/0194098 A1 | 8/2009 | Placer | |
| 2009/0199846 A1 | 8/2009 | Collins et al. | |
| 2009/0242014 A1 | 10/2009 | Leary | |
| 2009/0266352 A1 | 10/2009 | Wetmore | |
| 2009/0320907 A1 | 12/2009 | Botkin | |
| 2010/0000605 A1 | 1/2010 | Comert et al. | |
| 2010/0043781 A1 | 2/2010 | Jones et al. | |
| 2010/0065108 A1 | 3/2010 | West | |
| 2010/0162641 A1 | 7/2010 | Reyal et al. | |
| 2010/0163015 A1 | 7/2010 | Potter et al. | |
| 2010/0192505 A1 | 8/2010 | Schaefer | |
| 2010/0236610 A1 | 9/2010 | Stancel et al. | |

(56) References Cited

U.S. PATENT DOCUMENTS

| | | | |
|---|---|---|---|
| 2010/0243023 | A1 | 9/2010 | Patton et al. |
| 2011/0203637 | A1 | 8/2011 | Patton |
| 2011/0240207 | A1 | 10/2011 | Stanley |
| 2011/0250011 | A1 | 10/2011 | Schwarze |
| 2011/0260027 | A1 | 10/2011 | Farnham, Jr. et al. |
| 2011/0265861 | A1 | 11/2011 | Nabauer et al. |
| 2011/0272372 | A1 | 11/2011 | Peter et al. |
| 2011/0296773 | A1 | 12/2011 | Kellerman |
| 2012/0085394 | A1 | 4/2012 | McPheeters et al. |
| 2012/0097816 | A1 | 4/2012 | Tamm et al. |
| 2012/0107043 | A1 | 5/2012 | Kellerman |
| 2012/0145227 | A1 | 6/2012 | Jun et al. |
| 2012/0160787 | A1 | 6/2012 | Schummlochner |
| 2012/0186169 | A1 | 7/2012 | Tomaso |
| 2012/0240489 | A1 | 9/2012 | Rivera et al. |
| 2012/0273029 | A1 | 11/2012 | Bragagna et al. |
| 2012/0312355 | A1 | 12/2012 | Patton |
| 2012/0318322 | A1 | 12/2012 | Lanyon et al. |
| 2013/0091786 | A1 | 4/2013 | Dupont et al. |
| 2013/0136528 | A1 | 5/2013 | Kellerman |
| 2013/0136531 | A1 | 5/2013 | Kobayashi et al. |
| 2013/0210008 | A1 | 8/2013 | Feitsma et al. |
| 2013/0312812 | A1 | 11/2013 | Meyer et al. |
| 2013/0320161 | A1 | 12/2013 | Merhar |
| 2014/0014158 | A1 | 1/2014 | Wildes |
| 2014/0020308 | A1 | 1/2014 | Heisler |
| 2014/0060625 | A1 | 3/2014 | Beuke et al. |
| 2015/0013754 | A1 | 1/2015 | Yakushiji et al. |
| 2015/0034355 | A1 | 2/2015 | Patton |
| 2015/0040967 | A1 | 2/2015 | West et al. |
| 2015/0069198 | A1 | 3/2015 | West |
| 2015/0244308 | A1 | 8/2015 | Patton et al. |
| 2015/0326171 | A1 | 11/2015 | Patton |
| 2016/0020722 | A1 | 1/2016 | Patton et al. |
| 2016/0054030 | A1 | 2/2016 | Ilzhfer |
| 2017/0104445 | A1 | 4/2017 | Depauw |
| 2017/0222599 | A1 | 8/2017 | West et al. |
| 2017/0244354 | A1 | 8/2017 | Patton et al. |
| 2018/0191290 | A1 | 7/2018 | Guthrie et al. |
| 2018/0212556 | A1 | 7/2018 | Wegert et al. |
| 2018/0226916 | A1 | 8/2018 | Neuhauser et al. |
| 2019/0013774 | A1 | 1/2019 | Truthseeker et al. |
| 2020/0127599 | A1 | 4/2020 | Truthseeker et al. |
| 2020/0248735 | A1 | 8/2020 | Schmitz |
| 2020/0389124 | A1 | 12/2020 | Lyford |
| 2021/0313926 | A1 | 10/2021 | Cavieres et al. |
| 2022/0103117 | A1 | 3/2022 | Gong et al. |
| 2022/0302872 | A1 | 9/2022 | Patton et al. |
| 2024/0186944 | A1 | 6/2024 | Hafter et al. |
| 2024/0186945 | A1 | 6/2024 | Patton et al. |
| 2024/0258964 | A1 | 8/2024 | Hafter et al. |
| 2024/0297614 | A1 | 9/2024 | Hafter et al. |
| 2025/0192715 | A1 | 6/2025 | Patton et al. |
| 2026/0051839 | A1 | 2/2026 | Patton et al. |

FOREIGN PATENT DOCUMENTS

| | | | |
|---|---|---|---|
| CN | 102760782 | A | 10/2012 |
| CN | 202651163 | U | 1/2013 |
| CN | 208272919 | U | 12/2018 |
| CN | 112165298 | A | 1/2021 |
| CN | 117897906 | A | 4/2024 |
| CN | 114375543 | B | 8/2024 |
| CN | 118971771 | A | 11/2024 |
| CN | 119999080 | A | 5/2025 |
| DE | 3625119 | A1 | 1/1988 |
| DE | 29703481 | U1 | 11/1997 |
| DE | 19652568 | A1 | 6/1998 |
| DE | 20117716 | U1 | 3/2002 |
| DE | 102010022556 | B3 | 6/2011 |
| DE | 202012101023 | U1 | 7/2013 |
| EP | 1568950 | A1 | 8/2005 |
| EP | 2295893 | A1 | 3/2011 |
| EP | 2314926 | A1 | 4/2011 |
| EP | 3981071 | A1 | 4/2022 |
| EP | 3981071 | B1 | 8/2024 |
| FR | 2981738 | A1 | 4/2013 |
| GB | 803743 | | 4/1956 |
| GB | 2197457 | A | 5/1988 |
| JP | S60151184 | A | 10/1985 |
| JP | H10221533 | A | 8/1998 |
| JP | 10308522 | | 11/1998 |
| JP | 2006278672 | A | 10/2006 |
| JP | 2013118236 | A | 6/2013 |
| JP | 201475419 | A | 4/2014 |
| KR | 1020140036105 | A | 3/2014 |
| WO | 2006089770 | A1 | 8/2006 |
| WO | 2007038760 | A2 | 4/2007 |
| WO | 2009137809 | A1 | 11/2009 |
| WO | 2010054617 | A2 | 5/2010 |
| WO | 2013143178 | A1 | 10/2013 |
| WO | 2014004161 | A1 | 1/2014 |
| WO | 2015077526 | A1 | 5/2015 |
| WO | 2017005239 | A1 | 1/2017 |
| WO | 2018017646 | A1 | 1/2018 |
| WO | 2019041845 | A1 | 3/2019 |
| WO | 2020252091 | A1 | 12/2020 |
| WO | 2021036273 | A1 | 3/2021 |
| WO | 2021156645 | A1 | 8/2021 |
| WO | 2022225961 | A2 | 10/2022 |
| WO | 2024044096 | A1 | 2/2024 |

OTHER PUBLICATIONS

International Patent Application No. PCT/US20/037092, filed Jun. 10, 2020. First named inventor: Patton.

International Patent Application No. PCT/US20/037092, filed Jun. 10, 2020. First named inventor: Patton. Written Opinion of the International Searching Authority dated Sep. 10, 2020. 2 pages.

International Patent Application No. PCT/US20/037092, filed Jun. 10, 2020. First named inventor: Patton. International Search Report dated Sep. 10, 2020. 11 pages.

International Patent Application No. PCT/US20/037092, filed Jun. 10, 2020. First named inventor: Patton. International Preliminary Report on Patentability dated Feb. 3, 2021. 84 pages.

Global Sources, Solar Border, Aluminum Solar Panel Frame. Date unknown. 4 pages.

TTI, Moving Energy Forward. Flush Mount Rail System. 2 pages. (C) 2008.

www,quickmountpv.com/products.php; Quick Mount PV Products, Manufacterer of Waterproof Mounts for the PC Industry; 1 page. (c) 2009; retrieved Oct. 2, 2009. 3 pages.

www.ttisolar.com/prodcuts/flatjack_order.html; Flat Jack Roof Mount Order Form; 2 pages. (c) 2008 Thompson Technology Industries, Inc.

Solar Power System Installation Manual; SRS Mountain System, Rectangular Modules; Sharp Electronics Corp., 44 pages, Jun. 5, 2007.

www.we-llc.com/WEEB_hotitowrks.html; Bonding a PV module to an anodized aluminum frame using the WEEB; last accessed Oct. 2, 2009, 1 page.

U.S. Appl. No. 61/126,947; filed May 8, 2008. First named inventor: Patton.

U.S. Appl. No. 61/130,359; filed May 29, 2008. First named inventor: Patton.

U.S. Appl. No. 61/205,556; filed Jan. 21, 2009. First named inventor: Patton.

U.S. Appl. No. 15/589,069, filed May 8, 2017. First named inventor: Patton. Office Action dated Jul. 19, 2018. 11 pages.

Flat Jack (R) Roof Mount | TTI. Flat Jack Roof Mount Order Form. 2 pages. Oct. 2, 2009.

International Patent Application No. PCT/US2009/043368, International Search Report dated Jul. 9, 2009. 3 pages.

International Patent Application No. PCT/US2009/043368, Written Opinion dated Jul. 9, 2009. 23 pages.

International Patent Application No. PCT/US2009/043368, International Preliminary Report on Patentability dated Apr. 5, 2012. 42 pages.

(56) References Cited

OTHER PUBLICATIONS

U.S. Appl. No. 14/866,680, filed Sep. 25, 2015. First named inventor: Patton. Office Action dated Jan. 25, 2016. 7 pages.
U.S. Appl. No. 14/813,950, filed Jul. 30, 2015. First named inventor: Patton. Office Action dated May 25, 2016. 12 pages.
U.S. Appl. No. 13/561,905, filed Jul. 30, 2012. First named inventor: Patton. Notice of Allowance dated Apr. 7, 2015. 9 pages.
OMG Roofing Products; PowerGrip Roof Mount System pamphlet. copyright 2015; 2 pages.
U.S. Appl. No. 13/561,905, filed Jul. 30, 2012. First named inventor: Patton. Office Action dated Dec. 1, 2014. 7 pages.
U.S. Appl. No. 13/561,905, filed Jul. 30, 2012. First named inventor: Patton. Office Action dated Oct. 4, 2013. 8 pages.
U.S. Appl. No. 12/680,732, filed Mar. 29, 2010. First named inventor: Patton. Office Action dated Feb. 13, 2012. 20 pages.
U.S. Appl. No. 15/589,069, filed May 8, 2017. First named inventor: Patton. Office Action dated Sep. 26, 2017. 8 pages.
U.S. Appl. No. 14/866,680, filed Sep. 25, 2015. First named inventor: Patton. Notice of Allowance dated Sep. 8, 2016. 12 pages.
U.S. Appl. No. 14/866,680, filed Sep. 25, 2015. First named inventor: Patton. Office Action dated May 24, 2016. 13 pages.
U.S. Appl. No. 13/561,905, filed Jul. 30, 2012. First named inventor: Patton. Office Action dated Oct. 4, 2013. 7 pages.
U.S. Appl. No. 13/561,905, filed Jul. 30, 2012. First named inventor: Patton. Office Action dated Apr. 11, 2014. 12 pages.
U.S. Appl. No. 12/680,732, filed Mar. 29, 2010. First named inventor: Patton. Office Action dated Dec. 30, 2011. 7 pages.
U.S. Appl. No. 14/813,950, filed Jul. 30, 2015. First named inventor: Patton.
U.S. Appl. No. 15/589,069, filed May 8, 2017. First named inventor: Patton.
U.S. Appl. No. 13/561,905, filed Jul. 30, 2012. First named inventor: Patton.
U.S. Appl. No. 12/680,732, filed Mar. 29, 2010. First named inventor: Patton.
PCT Patent Application No. PCT/US2009/043368, filed May 8, 2009. First named inventor: Patton.
Chinese Patent Application No. 200980126953.X, Office Action dated Apr. 13, 2012. 3 pages.
Chinese Patent Application No. 200980126953.X, Office Action dated Nov. 13, 2012. 3 pages.
Chinese Patent Application No. 202080043363.7, Office Action dated Dec. 27, 2023. 7 pages.
European Application EP20820761.3, Communication of Intention to Grant dated Mar. 20, 2024, 9 pages.
U.S. Appl. No. 17/618,260, filed Dec. 10, 2021. First named inventor: Patton. Office Action dated Nov. 9, 2022. 15 pages.
U.S. Appl. No. 17/618,260, filed Dec. 10, 2021. First named inventor: Patton. Office Action dated Jun. 7, 2023. 16 pages.
U.S. Appl. No. 17/618,260, Notice of Allowance dated Jan. 12, 2024, 8 pages.
U.S. Appl. No. 17/618,260, Notice of Allowance dated Jan. 29, 2024, 2 pages.
U.S. Appl. No. 17/618,260, Notice of Allowance dated Apr. 10, 2024, 4 pages.
U.S. Appl. No. 17/618,260, filed Dec. 10, 2021. First named inventor: Patton.
U.S. Appl. No. 18/634,614, filed Apr. 12, 2024. First named inventor: Patton.
U.S. Appl. No. 18/634,614, filed Apr. 12, 2024. First named inventor: Patton. Office Action dated Sep. 9, 2024, 10 pages.
U.S. Appl. No. 18/634,614, filed Apr. 12, 2024. First named inventor: Patton. Office Action dated Mar. 21, 2025, 10 pages.
U.S. Appl. No. 17/618,260, filed Dec. 10, 2021. First named inventor: Patton. Corrected Notice of Allowance dated Apr. 29, 2024, 2 pages.
U.S. Appl. No. 17/618,260, filed Dec. 10, 2021. First named inventor: Patton. Issue Notification dated May 8, 2024, 2 pages.
European Application EP20820761.3, Supplementary European Search Report dated May 10, 2023, 7 pages.
Indian Patent Application No. 202117057281, First Examination Report dated Jul. 5, 2022, 5 pages.
Chinese Patent Application No. 202080043363.7, Notice to Undergo Registration Procedures and Notice to Grant Patent Right dated May 28, 2024, 2 pages.
Indian Patent Application No. 202117057281, Hearing Notice dated May 16, 2024, 3 pages.
European Application EP20820761.3, Decision to Grant dated Aug. 1, 2024, 2 pages.
European Application EP20820761.3, Unitary Patent Certificate dated Sep. 5, 2024, 1 page.
European Application EP20820761.3, Patent Certificate dated Aug. 28, 2024, 1 page.
Indian Patent Application No. 202117057281, Intimation of Grant dated Jul. 29, 2024, 1 page.
Indian Patent Application No. 202117057281, Patent Certificate dated Jul. 29, 2024, 1 page.
Chinese Patent Application No. 202080043363.7, Patent Certificate along with English Translation dated Aug. 16, 2024, 2 pages.

* cited by examiner

METHODS FOR ATTACHING SOLAR PANELS TO FRAMEWORKS

CROSS-REFERENCE TO RELATED APPLICATIONS

This application is a continuation of U.S. patent application Ser. No. 18/634,614, filed Apr. 12, 2024, which is the continuation of U.S. patent application Ser. No. 17/618,260, filed Dec. 10, 2021, which is the US National Phase of International Application No. PCT/US2020/037092, filed Jun. 10, 2020, which claims priority to and the benefit of U.S. Provisional Application No. 62/921,310, filed Jun. 10, 2019, each of the aforementioned applications and any priority case are hereby incorporated by reference herein in their entirety.

TECHNICAL FIELD

Embodiments of the present invention relate to frames that can be added to a panel. These frames may be folded in at least one bend area to create a frame around a panel.

BACKGROUND OF THE INVENTION

A photovoltaic solar panel may have a photovoltaic laminate perhaps with a frame around the laminate. A frame may add strength to the solar panel and may allow for easy attaching of a photovoltaic solar panel to a racking. A laminate may have solar photovoltaic cells encapsulated between glass and a protective back-sheet. Photovoltaic cells may generate DC power when exposed to sunlight.

Over the years, the cost of solar panels has decreased perhaps due to a decrease in the material and manufacturing costs and even an increased efficiency of the solar cells. However, the cost of a photovoltaic frame has remained mostly the same. Installation costs for attaching a frame to a racking has decreased perhaps due to the racking improvements and not because of the frame. There have been little changes to the frames. Therefore, there is a need to improve photovoltaic frames.

Embodiments of the present invention may provide a reduction in frame costs and installation costs perhaps due to a reduction in the costs for the materials of the improved frames, a reduction in costs for the manufacturing of the improved frames, and even a reduction of costs for the installation of the improved frames.

DISCLOSURE OF INVENTION

The present invention includes a variety of aspects, which may be selected in different combinations based upon the particular application or needs to be addressed. In various embodiments, the invention may include methods and systems for enclosing a panel, such as a solar panel with a framework that can be bent to form at least one about 90 degree angle.

It is an object of some embodiments of the present invention to provide a lower cost for the materials of a panel frame.

It is another object of some embodiments of the present invention to provide a lower cost for the manufacturing of a panel frame.

It is yet another object of some embodiments of the present invention to provide a lower cost for the installation of a panel frame.

It is an object of some embodiments of the present invention to provide a bendable panel frame.

It is another object of some embodiments of the present invention to provide attachments of a bendable panel frame perhaps at a corner or at a non-corner.

It is yet another object of some embodiments of the present invention to provide securements of a panel frame to a racking.

Naturally, further objects, goals and embodiments of the inventions are disclosed throughout other areas of the specification, claims, and drawings.

MODE(S) FOR CARRYING OUT THE INVENTION

Figure 1:
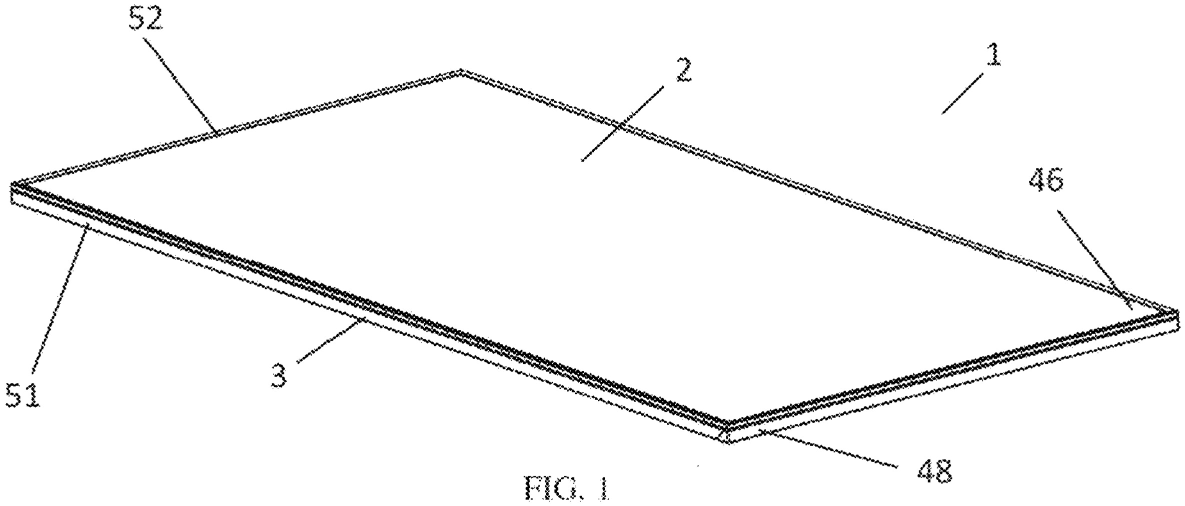
FIG. 1 shows a non-limiting example of a top view of a folded frame module in accordance with some embodiments of the present invention.

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention provide folded frames for panels such as for existing solar panels. A folded frame may be a lower cost alternative and it may be stronger, may be more rigid and perhaps even more adaptable for assembly of a solar panel in manufacturing.

Existing solar panels frames may be made of four individual sides that may be attached with screws or may be attached in the corners perhaps with pressed L-corners in cavities in the frame. The material of a frame may be extruded aluminum.

Embodiments of the present invention may provide a folded frame solar panel perhaps made of one piece, one folded piece, or more than one folded piece. Folds may be along the length of the frame and may be folded to make a corner. Strength and rigidity may be achieved with folds. Additional strength and rigidity may be achieved perhaps with folding of the corners and even an end attachment. More strength and rigidity may be achieved perhaps by further attachment of the corners.

A panel may include, but is not limited to, photovoltaic solar panels, solar thermal panels, or any other panel or the like. A folded frame solar panel, folded frame module, a folded frame, or even a framework as discussed herein may apply to all panels or the like. Materials for a framework may be any foldable material such as, but not limited to, aluminum, steel, or foldable metals, or the like. A metal material may include metal alloys.

A laminate may be any component or components contained within a folded framework. An assembly of a folded framework around a laminate may be referred to as a folded frame module.

Folds along the length of a frame may allow for the containment of a laminate and may even allow for unique shapes perhaps to aid in the attachment of the panels to a support or even these shapes may allow for other attachments to a panel frame. A folded frame may be folded in corners and may form a closed frame that may enclose a laminate on some or even all sides.

A seal may include, but is not limited to, silicone tape, urethane tape, any other seal tape, any type of seal foam tape, or the like. A tape may have pressure sensitive adhesive perhaps on one side or even both sides. A sealant may include, but is not limited to, liquid silicone, urethane, epoxy, resin, any other liquid seal, or the like. A sealant may be a liquid at application and may be able to be cured perhaps to a solid, solid elastomer, foam elastomer, or the like.

Embodiments of the present invention may provide various types of folded frame modules (1) perhaps with a folded frame to create a rectangular panel framework (3) and even an attached bottom frame lip (5). In some embodiments, a bottom frame lip (5) may provide increased strength and rigidity to a folded frame module (1).

Embodiments of the present invention may provide a method for enclosing a solar panel comprising the steps of providing an elongated single piece of panel framework (59); bending said elongated single piece of said panel framework around a corner (46) of a rectangular photovoltaic laminate (2) to create an about 90-degree angle (61) in said elongated single piece of said panel framework; placing said bent elongated single piece of panel framework (47) around said corner of said photovoltaic laminate; and perhaps even creating at least a partial frame (48) around said corner of said rectangular photovoltaic laminate with said bent elongated single piece of panel framework. Other embodiments of the present invention may provide a structure comprising: an elongated single piece of panel framework; a bend area (89) in said elongated single piece of said panel framework capable of being bent around a corner of a rectangular photovoltaic laminate to create an about 90-degree angle in said elongated single piece of said panel framework; and perhaps even at least a partial frame formed around said corner of said rectangular photovoltaic laminate with said bent elongated single piece of panel framework.

Figure 57:
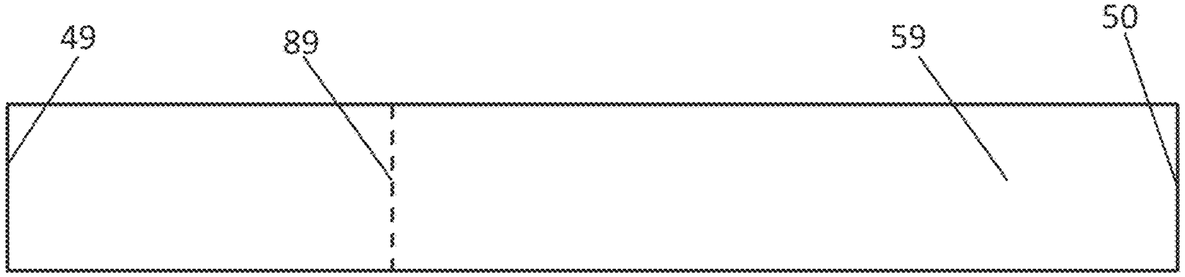
FIG. 57 shows a non-limiting example of an elongated single piece of panel framework in accordance with some embodiments of the present invention.
Figure 58:
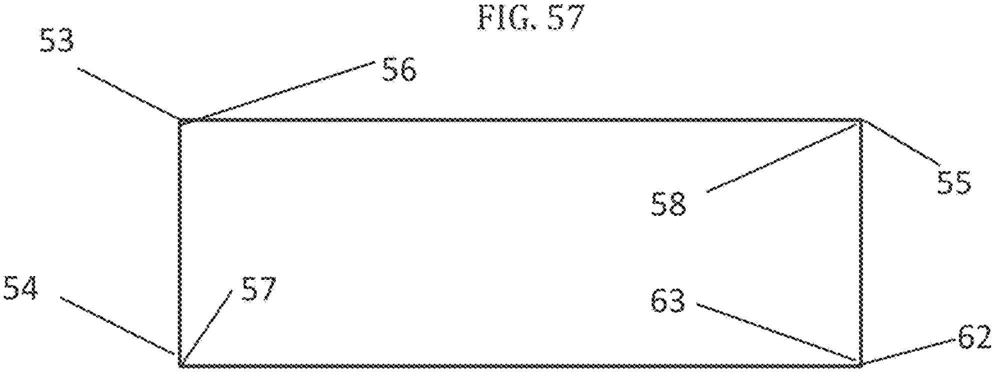
FIG. 58 shows a non-limiting example of a framework in accordance with some embodiments of the present invention.

An elongated single piece of panel framework (59) may be frame of any type that can be bent at at least one bend area (89) to create at least a partial frame (48) around a corner (46) of a panel, such as a rectangular photovoltaic laminate (2) as may be understood in FIGS. 1 and 57. A panel framework may be vertically folded along a bend area (89) perhaps creating a vertical bend area. A bend in a framework may create an about 90 degree angle (61) which can go around a corner of a panel. Of course, a 90 degree angle may be achieved or in some instances, an angle may be several degrees more or less perhaps depending on the shape of the panel, the shape of the framework, or the like. An elongated single piece of panel framework (59) may have a first end (49) and a second end (50) as may be understood from FIG. 57. A second end (50) may be from a same single piece of framework as a first end (49) where a single piece of framework may be attached to itself. An end (60), as may be understood from FIG. 21, may be from a separate framework where ends of two different pieces of frameworks may be attached together. Attachment of ends of frameworks (either attached to itself or perhaps attached to a separate framework) may be at a corner (9) or may even be at a non-corner (45). A corner may be an angled convergence of two surfaces. A non-corner may be an intersection of two parallel surfaces.

An elongated single piece of panel framework (59) may have a length (51) which may be about the length of a perimeter (52) of a rectangular photovoltaic laminate and therefore may be able to be attached to itself. An elongated single piece of panel framework may be prefolded at bend areas. Prefolded may be a partial fold in a framework.

Embodiments of the present invention may provide that an elongated single piece of panel framework (59) may be bent to have at least one about 90 degree angle, may have at least two about 90 degree angles, may have at least three 90 degree angles, and may even have at least 4 90 degree angles or more. In some embodiments, a framework may have up to three bends therein perhaps at three different positions (53, 54, 55) which may even create three about 90-degree angles (56, 57, 58) at each of the positions. In other embodiments, a framework may have up to four bends therein perhaps at four different positions (53, 54, 55, 62) which may even create four about 90-degree angles (56, 57, 58, 63) at each of the positions. A framework may then be attached to perhaps form a rectangular panel framework (3). A framework may encase a laminate or a panel.

Figure 2:
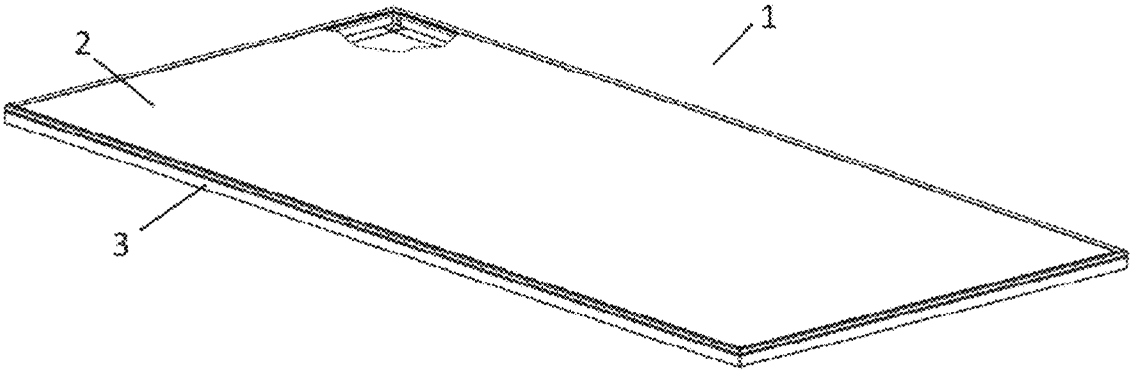
FIG. 2 shows a non-limiting example of a top view of a folded frame module with part of a laminate removed to show a frame thereof in accordance with some embodiments of the present invention.
Figure 3:
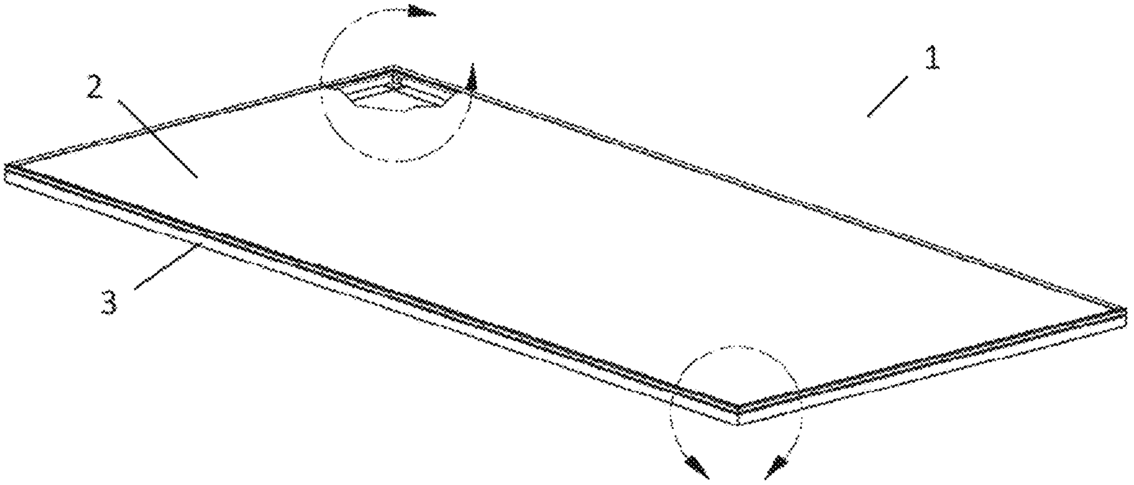
FIG. 3 shows a non-limiting example of a top view of a folded frame module with part of a laminate removed to show a frame thereof in accordance with some embodiments of the present invention.
Figure 4:
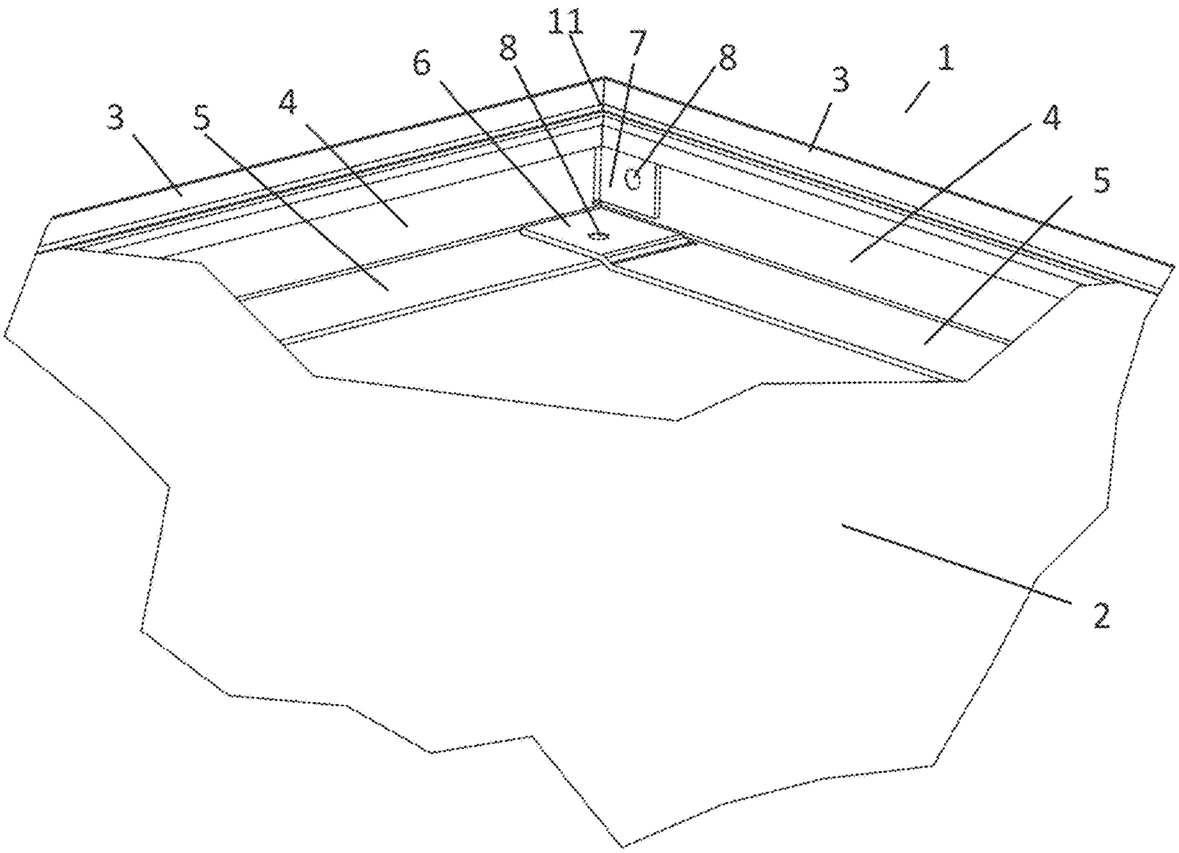
FIG. 4 shows a non-limiting example of an exploded view of the section of a frame as indicated in FIG. 3 in accordance with some embodiments of the present invention.
Figure 5:
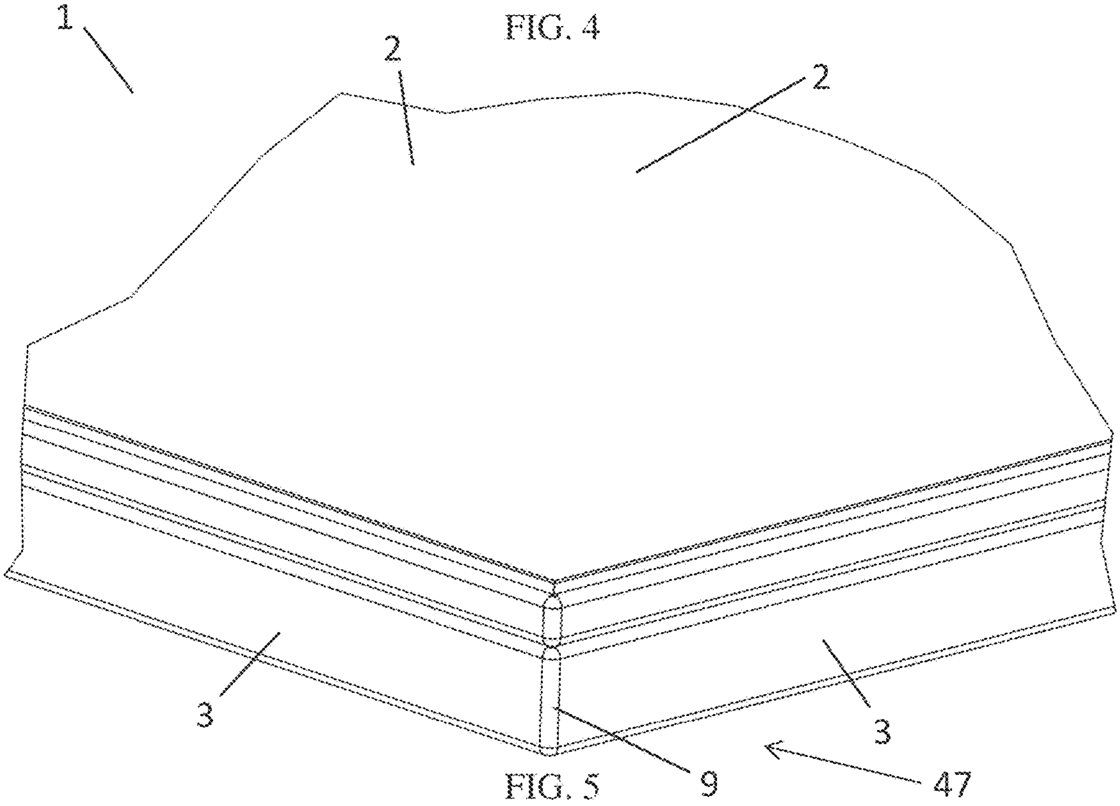
FIG. 5 shows a non-limiting example of an exploded view of the section of a frame as indicated in FIG. 3 in accordance with some embodiments of the present invention.
Figure 6:
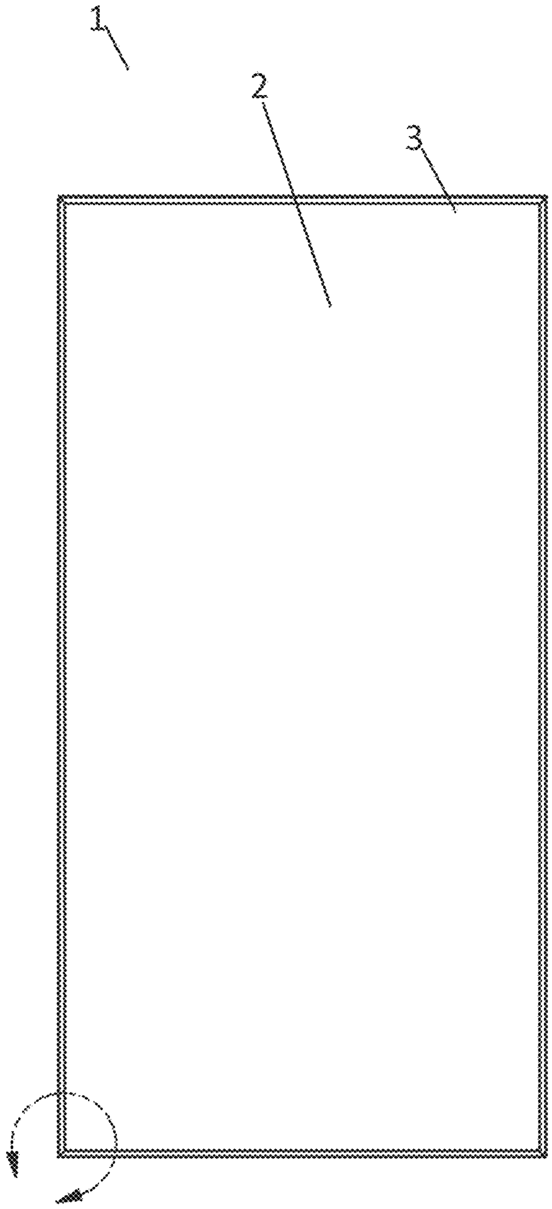
FIG. 6 shows a non-limiting example of a top view of a folded frame module in accordance with some embodiments of the present invention.
Figure 7:
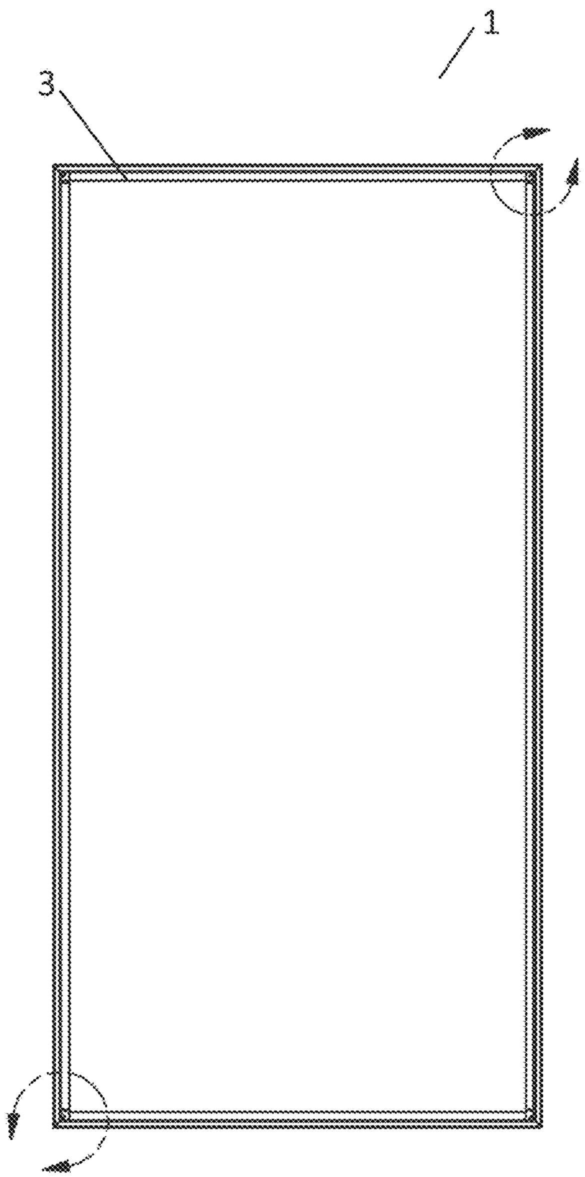
FIG. 7 shows a non-limiting example of a top view of a folded frame module with a laminate and seal removed in accordance with some embodiments of the present invention.
Figure 8:
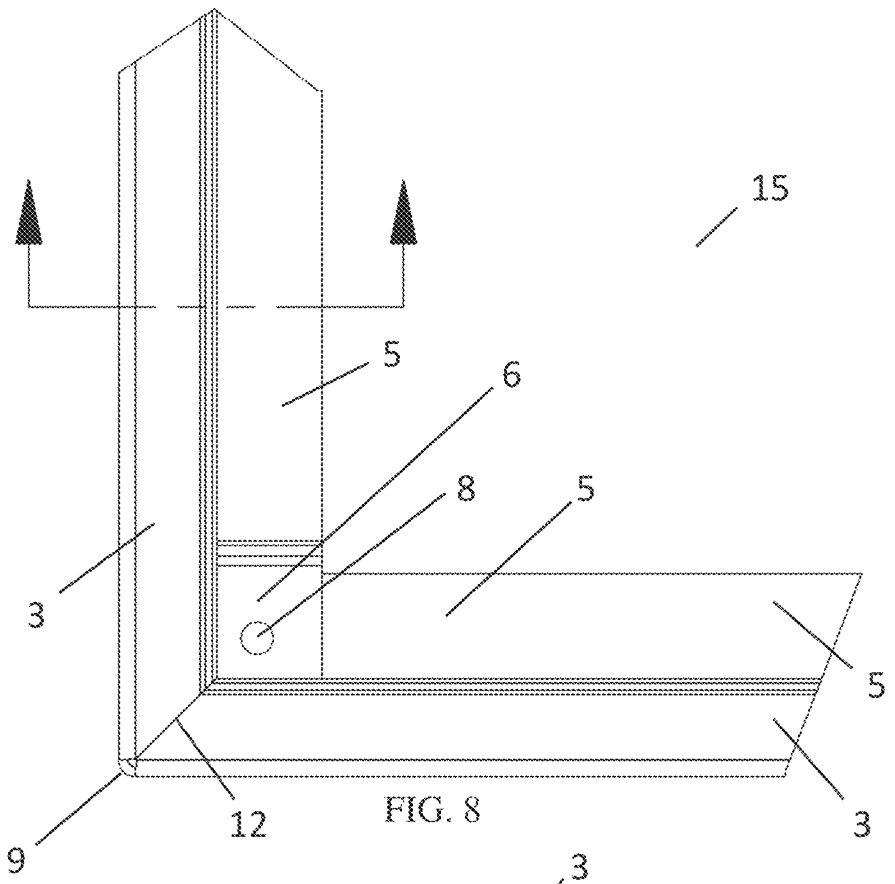
FIG. 8 shows non-limiting example of an enlarged view of the bottom left detail of FIG. 7 in accordance with some embodiments of the present invention.
Figure 9:
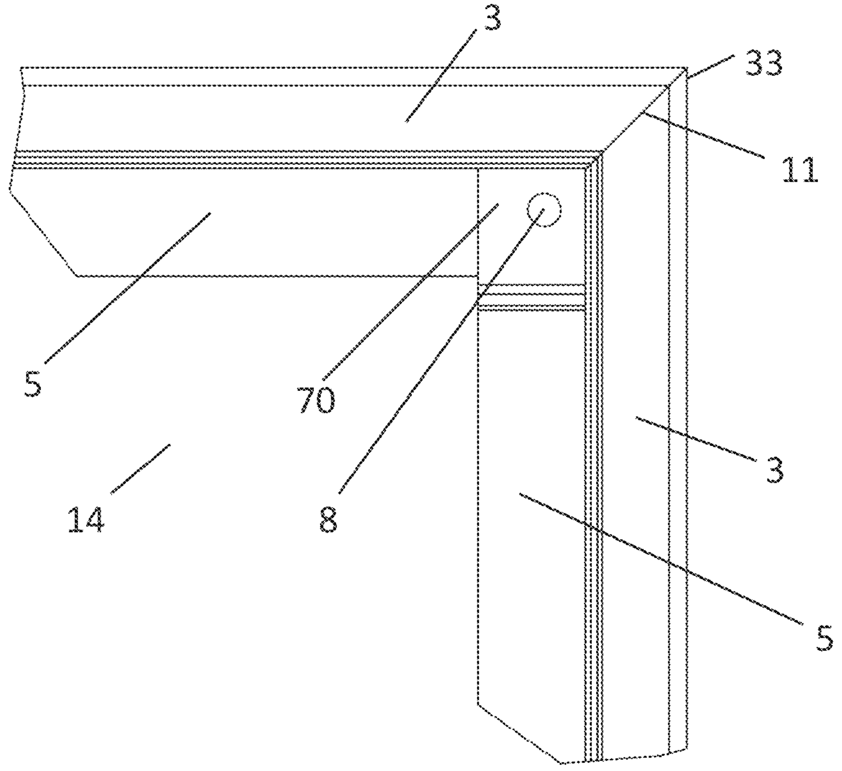
FIG. 9 shows a non-limiting example of an enlarged view of the top right detail of FIG. 7 in accordance with some embodiments of the present invention.
Figure 10:
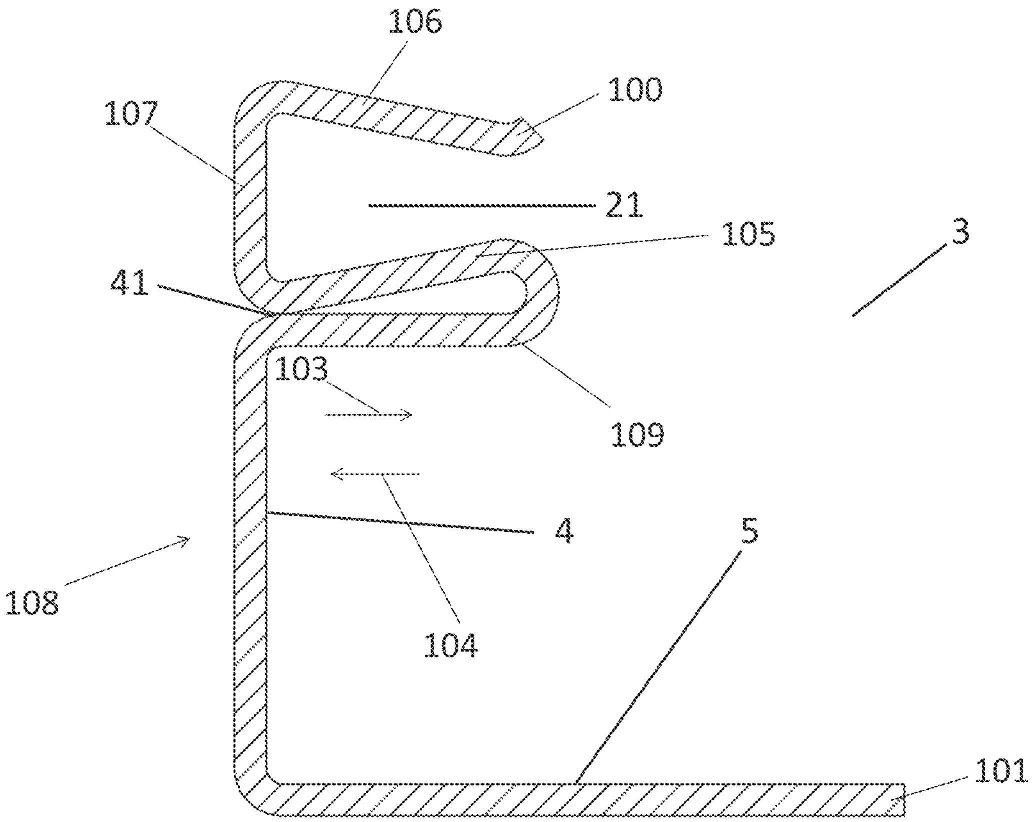
FIG. 10 shows a non-limiting example of a cross section view of FIG. 8 in accordance with some embodiments of the present invention.
Figure 12:
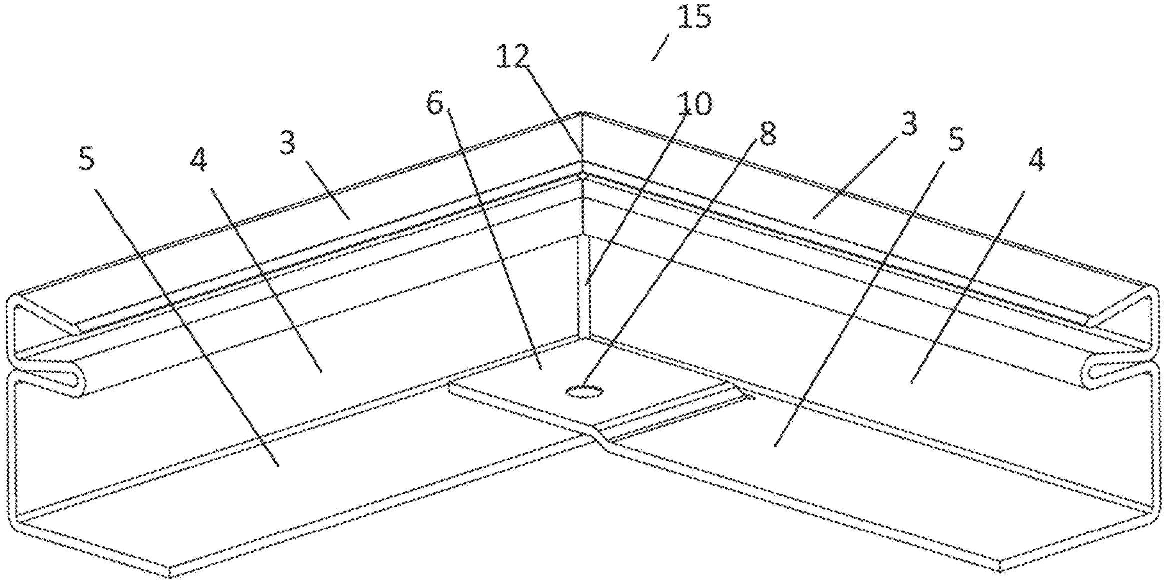
FIG. 12 shows a non-limiting example of a perspective view of FIG. 8 in accordance with some embodiments of the present invention.
Figure 13:
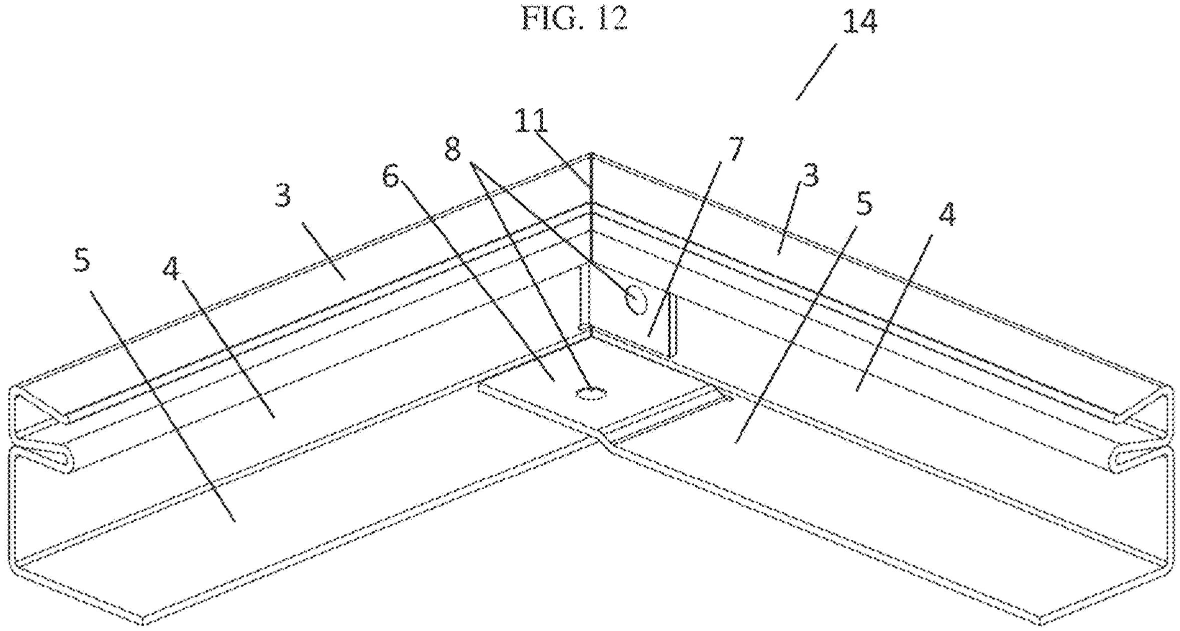
FIG. 13 shows a non-limiting example of a perspective view of FIG. 9 in accordance with some embodiments of the present invention.

FIG. 1 shows a non-limiting example of a folded frame module (1) with a rectangular photovoltaic laminate (2) and a rectangular panel framework (3). FIG. 2 may be similar to FIG. 1 except a corner of the laminate (2) is removed to show an attached corner of the rectangular panel framework (3). FIG. 3 may be similar to FIG. 2 except the corner views are added. FIG. 4 shows an enlarged view of the cut out section of FIG. 3 and FIG. 5 shows the other enlarged view of FIG. 3. FIG. 6 shows the top view of FIG. 1 and FIG. 7 shows the view of FIG. 1 without the laminate (2), seal (44) or sealant (36). FIG. 8 is an enlarged top view of the bottom left view detail shown in FIG. 7. FIG. 9 is an enlarged view of the top right view detail shown in FIG. 7. FIG. 10 is a cross section view in FIG. 8. FIG. 11 and FIGS. 39-41 are enlarged cross sections of those shown in FIG. 8 without the laminate (2), sealant (36), or seal (44). FIG. 12 shows a perspective view of FIG. 8 and FIG. 13 shows a perspective view of FIG. 9.

Figure 15:
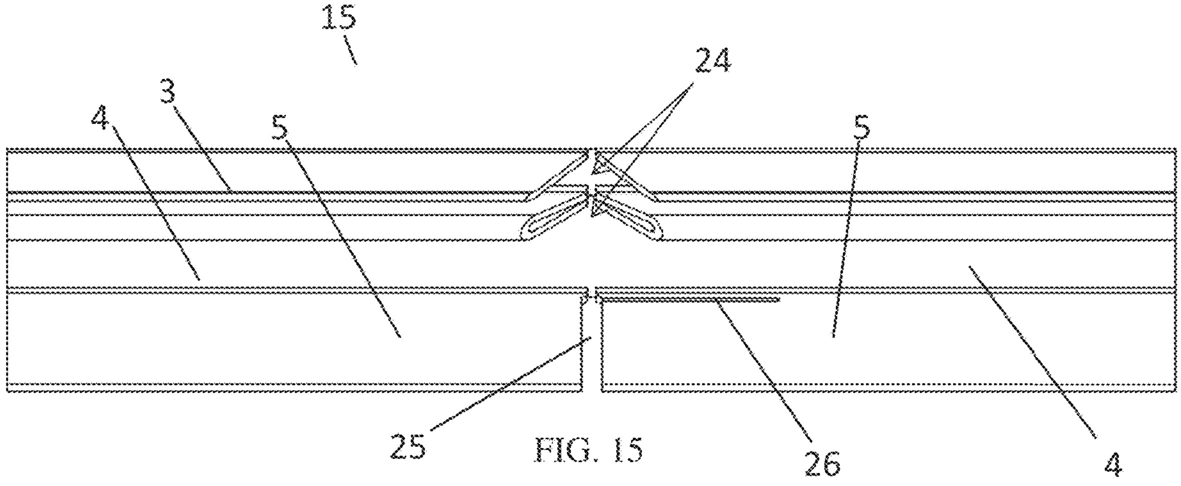
FIG. 15 shows a non-limiting example of an unfolded frame in accordance with some embodiments of the present invention.
Figure 16:
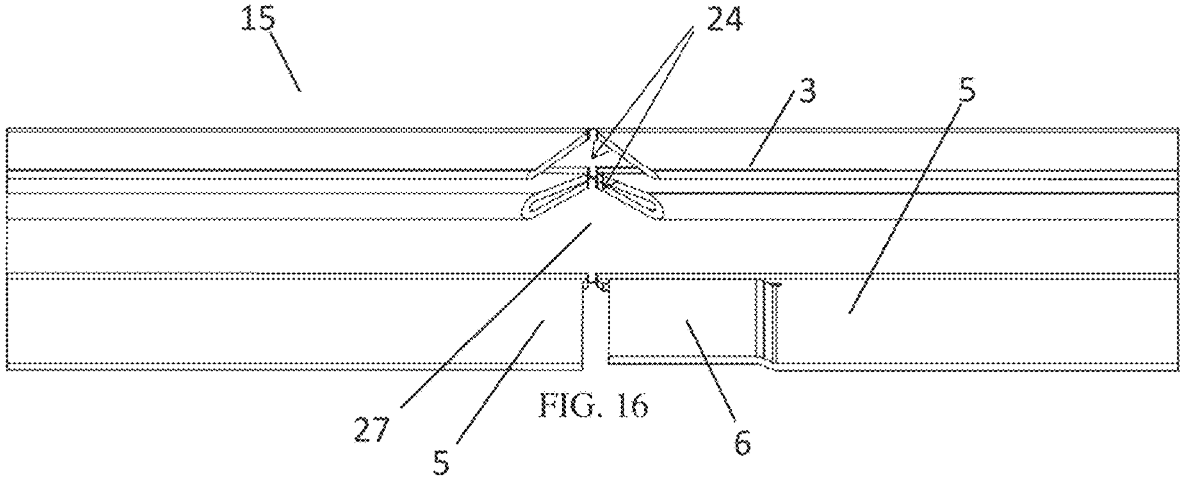
FIG. 16 shows a non-limiting example of an unfolded frame in accordance with some embodiments of the present invention.

Corners of a framework may be folded perhaps as shown in FIGS. 8 and 12. An example of a frame bend corner (15) is shown in FIGS. 8 and 12. FIGS. 15 and 16 show an example of a framework (3) prior the bending of the corner. A notch (24), which may be a corner notch or even a frame lip notch (25) and perhaps even a frame lip offset slot (26) may be fabricated on a framework perhaps as shown in FIG. 15. A frame lip offset perhaps a first end overlap frame lip offset (6) may be formed as shown in FIG. 16. A framework (3) such as shown in FIG. 16 may be folded around a corner fold area (27). This fold may be between edges of notches (24). A corner may be a frame join corner or even a frame bend corner. A frame bend corner (15) may have a frame inside bend corner (10) and even a frame outside bend corner (9) perhaps as shown in FIGS. 8 and 12. A frame bend corner (15) may have a frame corner top bend junction (12) perhaps as shown in FIGS. 8 and 12. Multiple frame bend corners (15) may be folded like shown in the FIGS.

Figure 11:
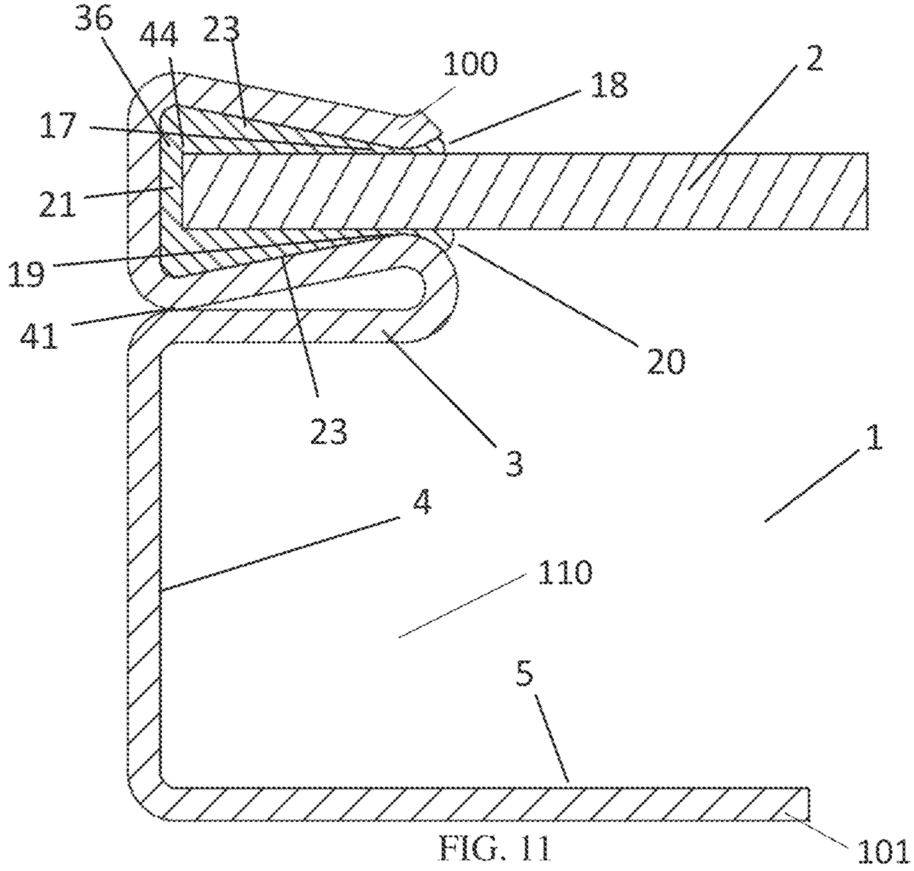
FIG. 11 shows a non-limiting example of an enlarged cross section as shown with FIG. 8 in accordance with some embodiments of the present invention.

An elongated single piece of panel framework may have a top end (100) and a bottom end (101) perhaps so that when folded in a particular way, a top end may be located above a rectangular photovoltaic laminate (2) a bottom end may be located below a rectangular photovoltaic laminate (2) when the laminate may be attached to the panel framework, a non-limiting example of which is shown in FIGS. 10 and 11.

Figure 56:
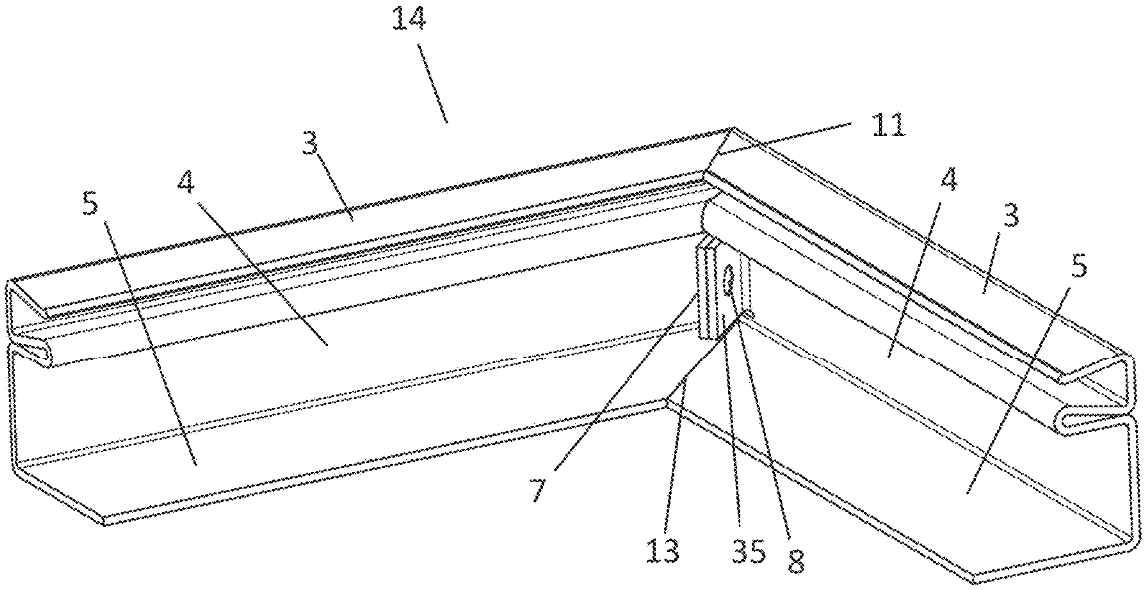
FIG. 56 shows a non-limiting example of a corner in accordance with some embodiments of the present invention.

In attaching ends of a panel framework (either attached to itself or perhaps attached to a separate framework a first attachment protrusion (7) may be located at a first end (49) of a panel framework and a second attachment protrusion (35) may be located at a second end (50) or end (60) of a panel framework or an end (60) of a second panel framework. The two ends may be placed together perhaps to create a corner and the first attachment protrusion may be joined with a second attachment protrusion. Such attachment protrusions may be located perpendicular on a panel framework perhaps as shown in FIG. 56. A panel framework may have a side frame wall (4), a bottom frame lip (5), a top frame lip, a notch having side edges (67). A bottom frame lip or even a top frame lip may be located perpendicular to side frame wall. An attachment protrusion may be located on any part of a panel framework.

Figure 35:
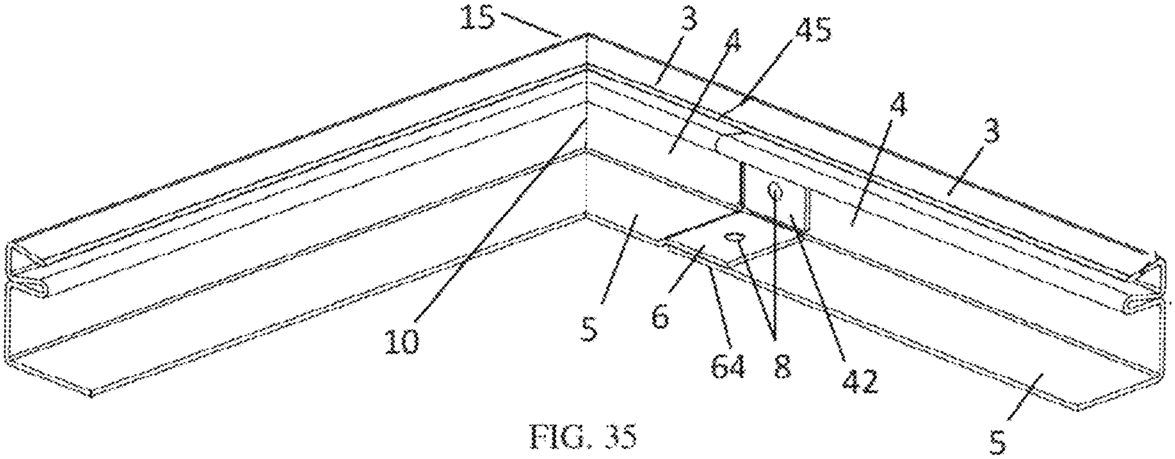
FIG. 35 shows a non-limiting example of joining of ends along a non-corner in accordance with some embodiments of the present invention.

A first end of a framework may be connected to a second end of framework perhaps by connected a first end to a second end by overlapping edges (6, 64) of each end as may be understood from the non-limiting example in FIG. 35. A first end of a framework may be connected to a second end of framework perhaps by connecting a first end (49) to a second end (50 or 60) at a junction (45) and even adding a bracket over a junction as may be understood from the non-limiting examples in FIGS. 36 and 37.

Figure 30:
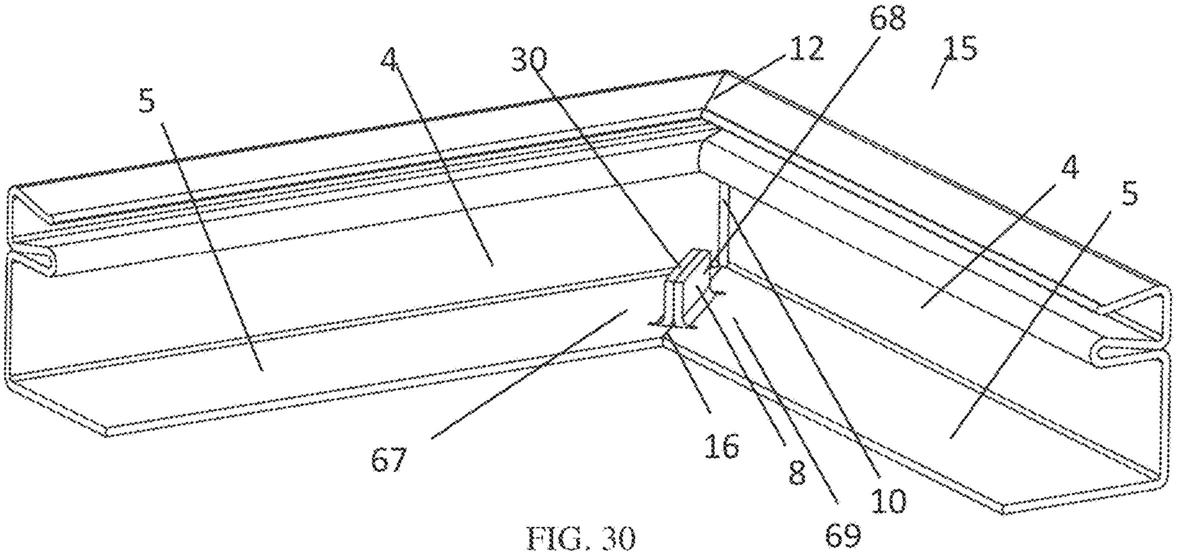
FIG. 30 shows a non-limiting example of an attachment of a bottom frame lip in accordance with some embodiments of the present invention.

A frame lip offset (6) may be positioned above an adjacent bottom frame lip (5) and may be attached together by an attachment (8). A bottom frame lip (5) may also be joined together perhaps as shown in FIG. 30. Bent junction tabs (30) may be formed and may be attached together by the attachment (8). Bent junction tabs (30) may also be used for a frame join corner (14). A frame joint corner (14) perhaps as shown in FIG. 56 may have two side frame walls (4) that may be joined together with two frame wall bent lips (7). Frame wall bent lips (7) may be bent towards an inside perhaps in a direction of a folded frame module (1). For each framework (3), a inside bent angle perhaps between each frame wall bent lips (7) and a side frame wall (4) may be an acute angle.

Figure 31:
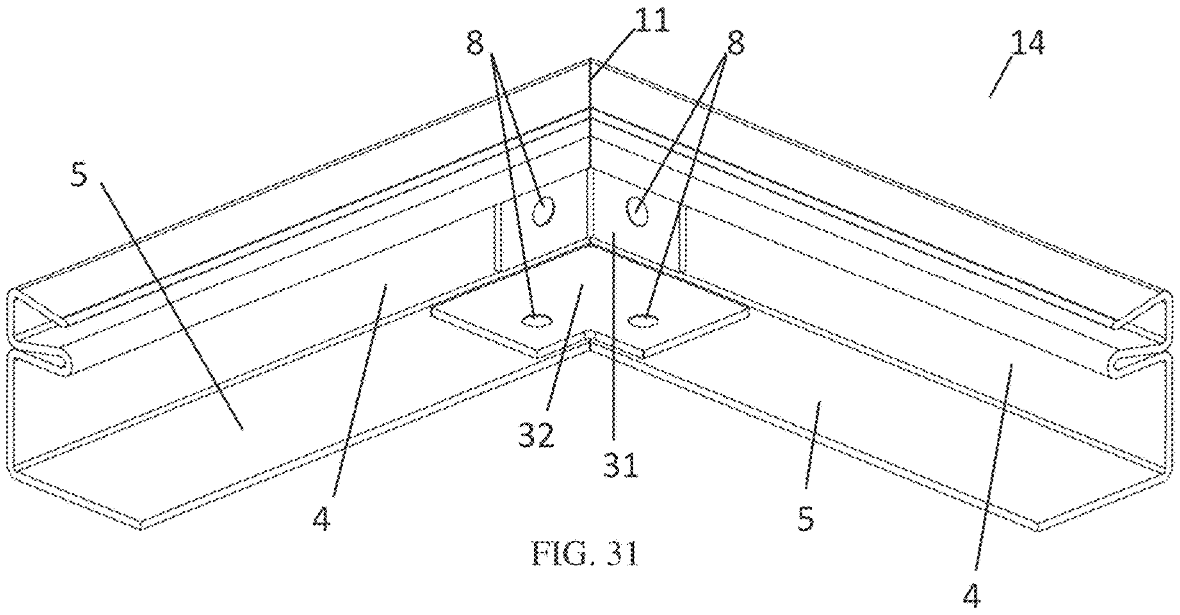
FIG. 31 shows a non-limiting example of an attachment of a bottom lip frame in accordance with some embodiments of the present invention.
Figure 32:
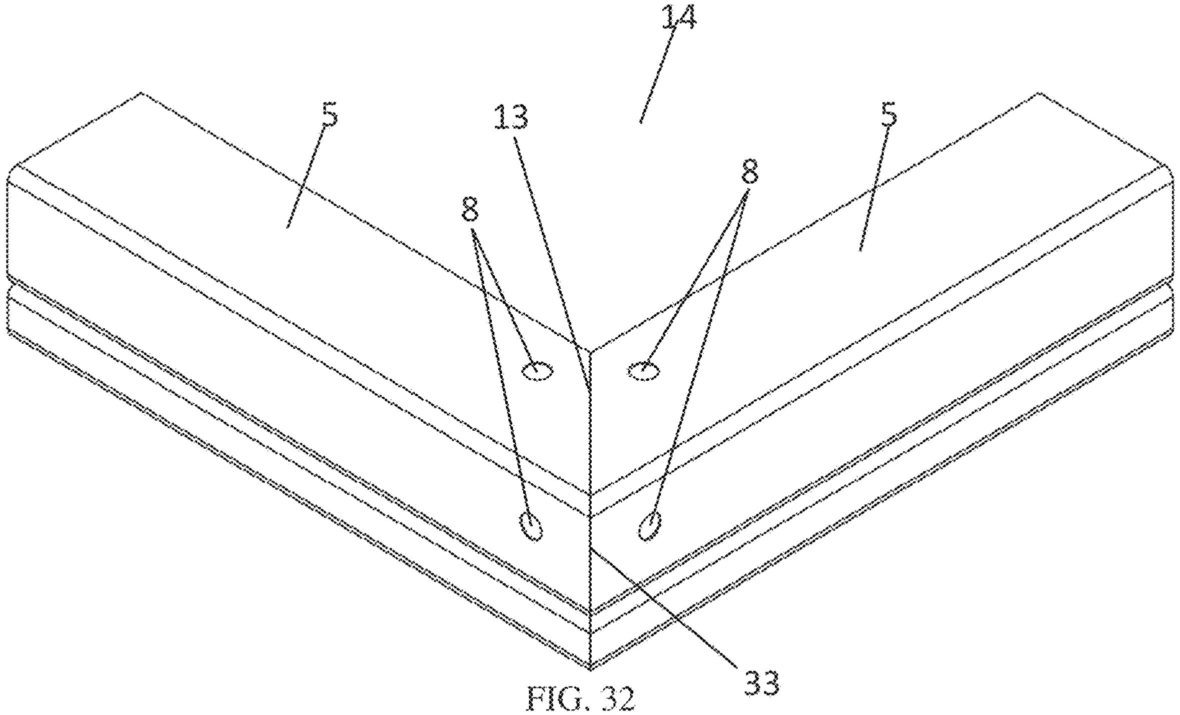
FIG. 32 shows a non-limiting example of an outside corner of a frame in accordance with some embodiments of the present invention.
Figure 33:
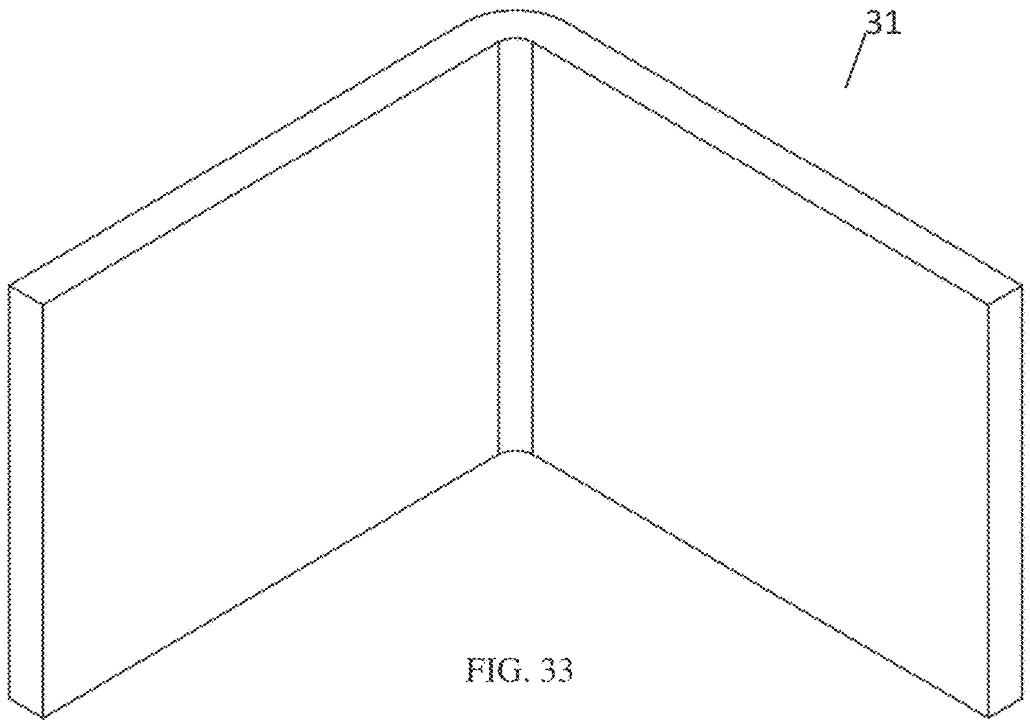
FIG. 33 shows a non-limiting example of a corner bracket in accordance with some embodiments of the present invention.
Figure 34:
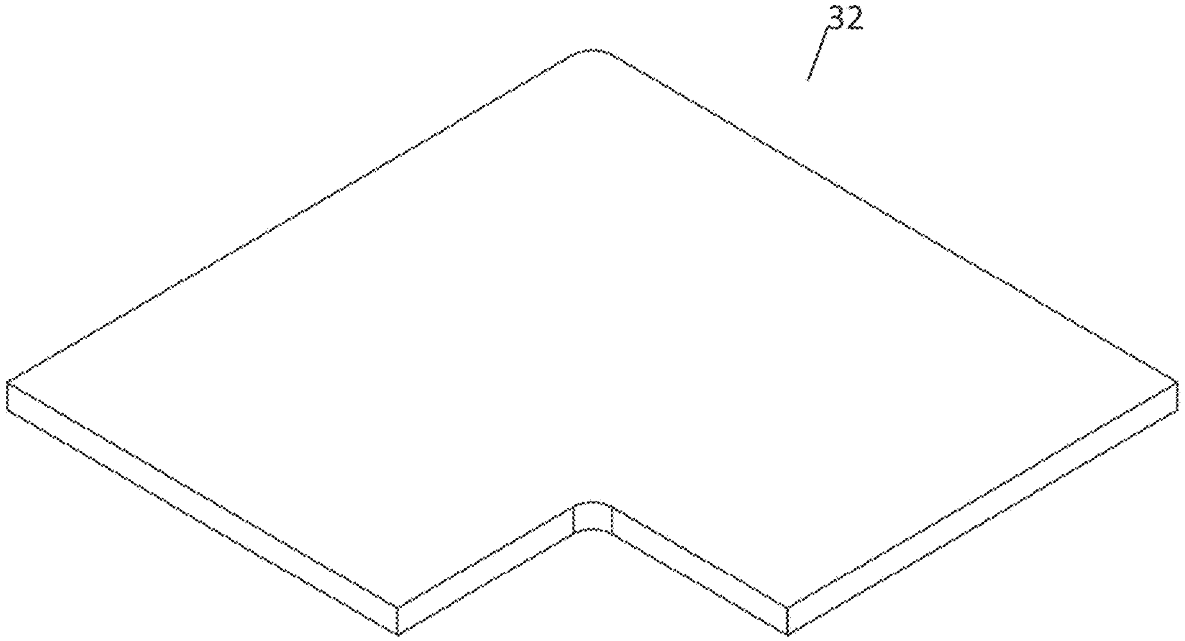
FIG. 34 shows a non-limiting example of a bottom frame lip bracket in accordance with some embodiments of the present invention.

Brackets may be used for attaching a bottom frame lips (5) perhaps as shown FIGS. 31-33. A bottom frame lip bracket (32) may be attached to bottom frame lips (50 perhaps by an attachment (8). In some embodiments, this attachment may be used in place of the frame lip offset (6) perhaps as shown in FIG. 12. An attachment of the bottom frame lips (5) and folding of a framework (3) corner may make a strong and rigid corner.

Figure 14:
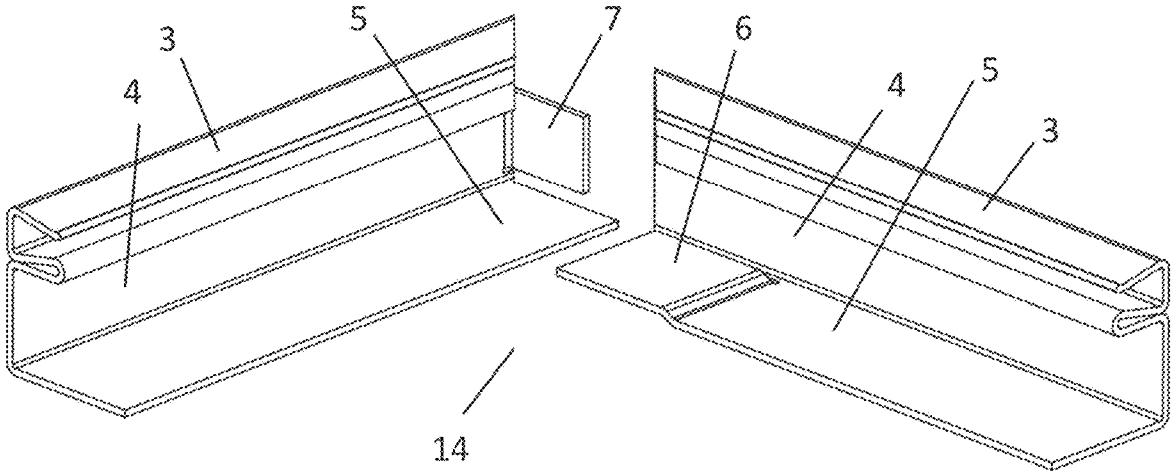
FIG. 14 shows a non-limiting example of a frame join corner in accordance with some embodiments of the present invention.

A frame joint corner (14) perhaps as shown in FIGS. 9, 13 and 14, may have a bent lip (7) attached to side frame walls (4). This may firmly and rigidly attach the two adjoining side frame walls. A frame lip offset (6) may be attached to a bottom frame lip (5) by an attachment. This may firmly and rigidly attach the two adjoining bottom frame lips. This attachment may be the two ends of a framework (3). FIG. 14 shows a non-limiting example of the two ends prior to the attachment. Frames may be brought together to form a corner perhaps as shown at the frame corner top join junction (11). There may be more than one frame join corner (14).

Brackets may be used for the frame join corners (14) perhaps as shown FIGS. 31-34. The corner bracket (31) may attach two side frame walls perhaps by an attachment and the bottom frame lip bracket (32) may attach the two bottom frame lips (5) by an attached area. The frames may be brought together to form a corner perhaps as shown at the frame corner top join junction (11). The attachment of the side frame walls (4) and the bottom frame lips may make a strong and rigid corner on the folded frame module. Prior to the corner folding and end attachment, a seal (44) may be attached to the laminate edges. This final insertion is shown in FIG. 11.

For another sealing method, perhaps prior to the corner folding and end attachment, a sealant (36) may be applied in a pocket area (21) which may include the inside top sealant area (17) and inside bottom sealant area (19) perhaps as shown in FIGS. 11, and 39-41. Some may be applied to the outside top sealant area (18) and even an outside bottom sealant area (20).

When a framework may be folded around a laminate and perhaps secured at the ends, such as shown in FIGS. 1-4, and 6, a sealant (36) may squeeze out in the outside top sealant area (18) and even the outside bottom sealant area (20). A sealant pocket (22) may reduce the amount of sealant (36) in an outside top sealant area (18). Pushing a laminate close or even against a pocket top area (38) may help an amount of sealant (36) in an outside top sealant area (18).

Figure 39:
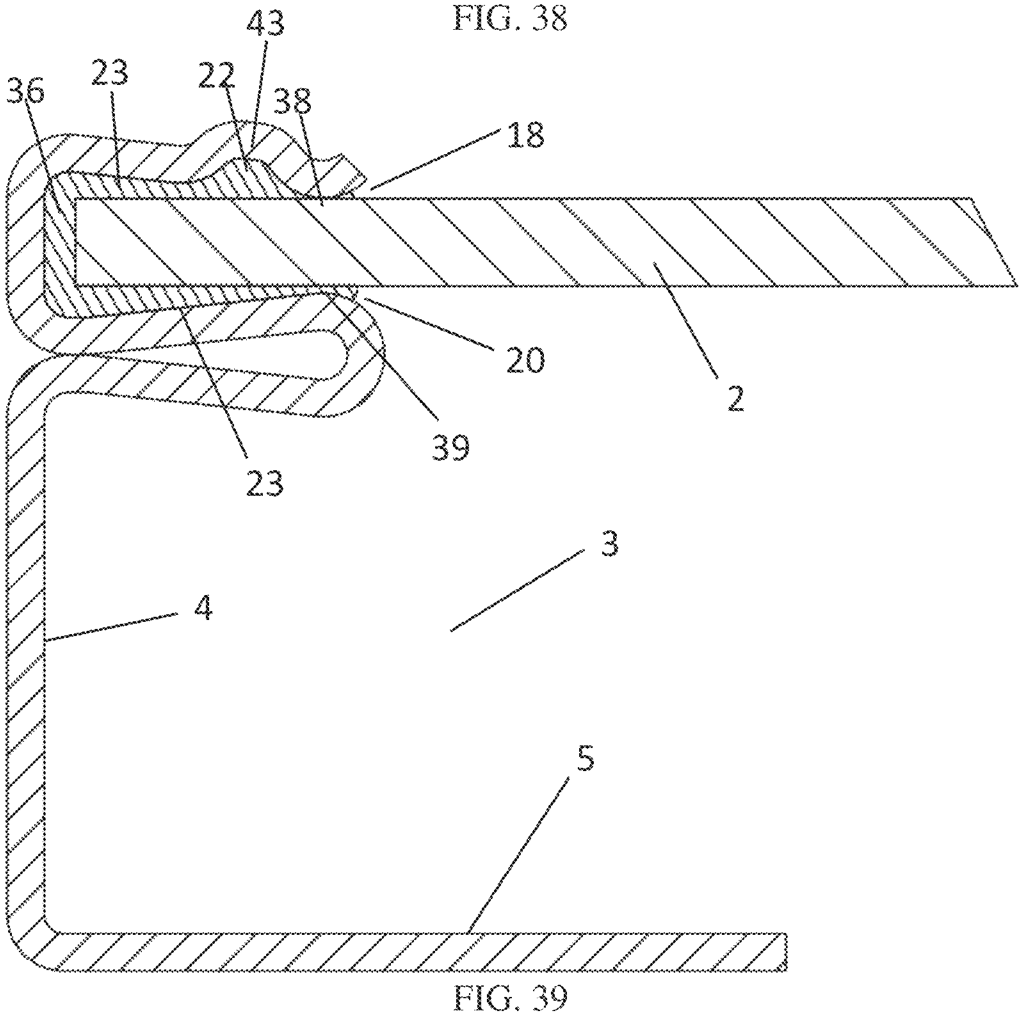
FIG. 39 shows a non-limiting example of an enlarged cross section as shown with FIG. 8 in accordance with some embodiments of the present invention.
Figure 40:
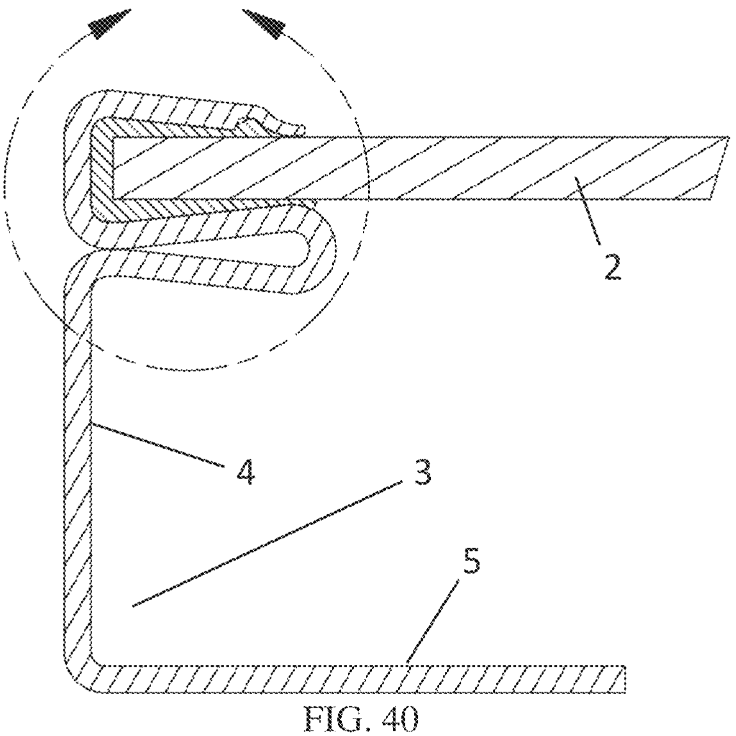
FIG. 40 shows a non-limiting example of an enlarged cross section as shown with FIG. 8 in accordance with some embodiments of the present invention.
Figure 41:
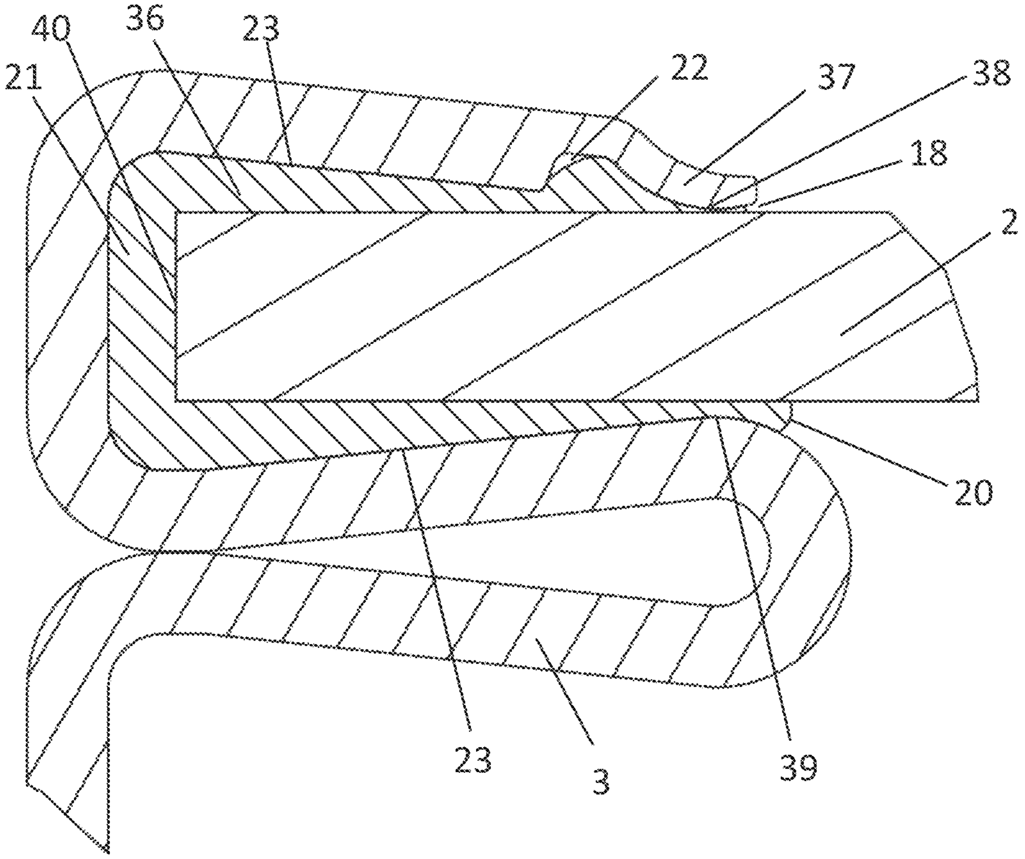
FIG. 41 shows a non-limiting example of an enlarged cross section as shown with FIG. 8 in accordance with some embodiments of the present invention.

As may be understood from FIG. 39, a sealant pocket (22) may create a frame top protrusion (43). This frame top protrusion (43) could be reduced or even eliminated if a framework (3) material thickness was perhaps reduced at an end perhaps as shown in FIGS. 40-41, perhaps with the narrow frame lip (37). If a laminate may be forced up or even down, the slanted walls (23) may allow room for the laminate end (40) to flex which may allow for less stress in the laminate perhaps near a pocket top area (38) for up-force on the laminate and even near a pocket bottom area (39) for down-force on the laminate.

FIGS. 17-29 show non-limiting examples of a folded frame module (1) without an attached bottom frame lip (5). A folded frame module may be less strong or rigid than a folded frame module with an attached bottom frame lip (5) but fabrication and costs may be lower and may be desirable for less rigid folded frame module applications.

Embodiments of the present invention may provide a notch (24) in a framework, perhaps even in a bottom frame lip (5). A notch may be placed below where an about 90-degree angle can be created when a framework may be bent around a corner of a laminate. Edges (65, 66) of a notch perhaps in a bottom frame lip may meet to create a bottom frame lip bend junction (16). It is noted that a junction may have edges touching each other or there may be a gap between the edges.

Figure 20:
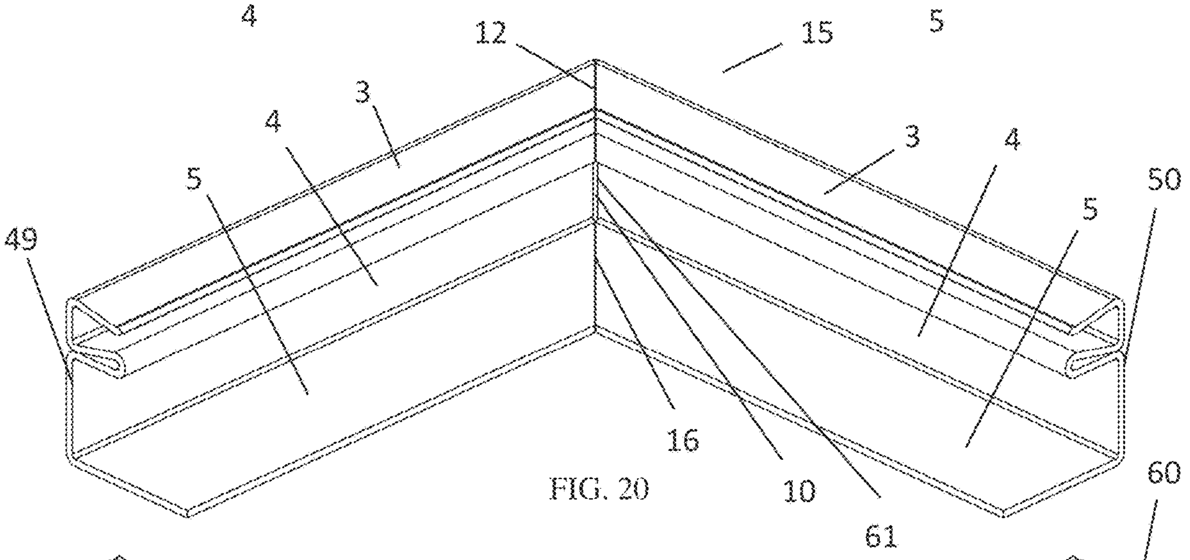
FIG. 20 shows a non-limiting example of a folded frame in accordance with some embodiments of the present invention.
Figure 21:
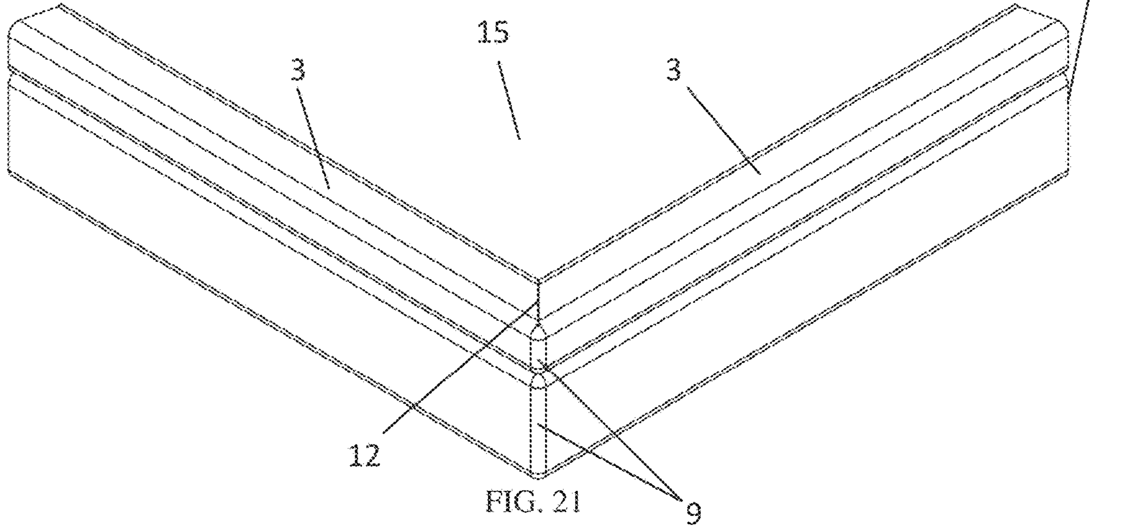
FIG. 21 shows a non-limiting example of a folded frame in accordance with some embodiments of the present invention.
Figure 22:
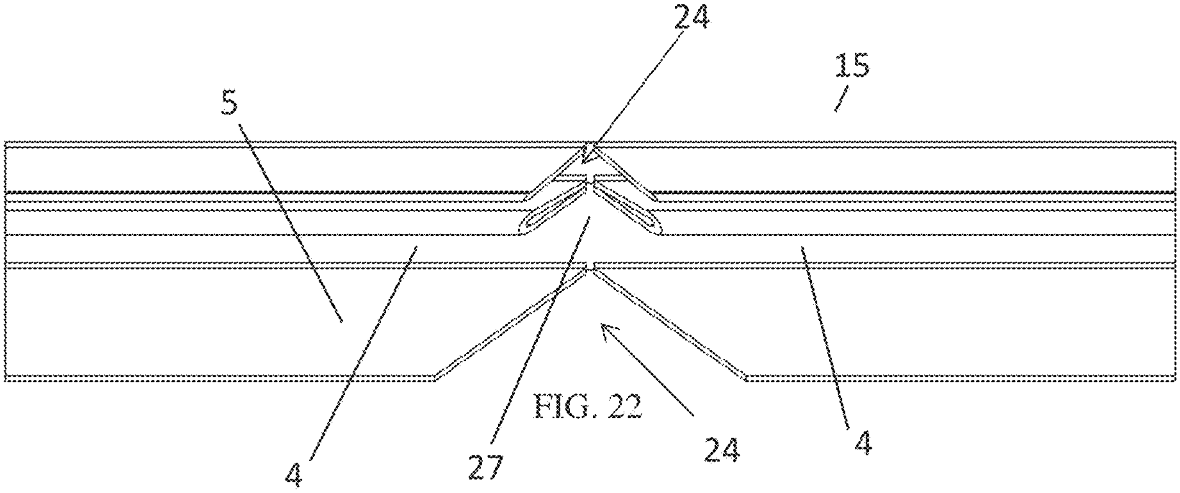
FIG. 22 shows a non-limiting example of a notch in a frame in accordance with some embodiments of the present invention.
Figure 23:
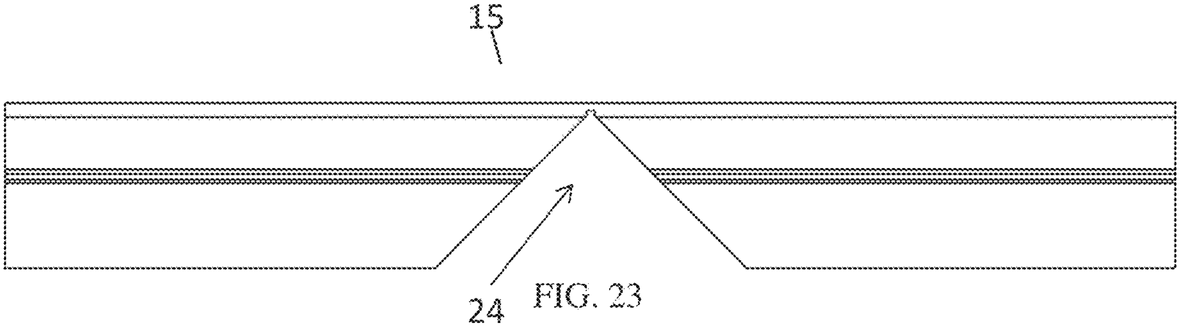
FIG. 23 shows a non-limiting example of a notch in a frame in accordance with some embodiments of the present invention.

Referring to the non-limiting examples in FIGS. 22-27, a framework (3) may be folded in the shape shown in FIGS. 20 and 21. For the folded corners perhaps as shown in FIGS. 20 and 21, a framework (3) and perhaps a notch (24) may be fabricated as shown in FIGS. 22 and 23. A framework (3) such as in FIG. 22 may be folded around a corner fold area (27). This fold may be between the edges of a notch (24). A frame bend corner (15) may have a frame inside bend corner (10) and even a frame outside bend corner (9) perhaps as shown in FIGS. 20 and 21. A frame bend corner (15) may have a frame corner top bend junction (12) and even a bottom frame lip bend junction (16). Multiple frame bend corners (15) of a framework may be folded like this.

A bottom lip frame junction (16) may be secured perhaps by overlapping an offset (70) of a bottom lip frame.

Figure 24:
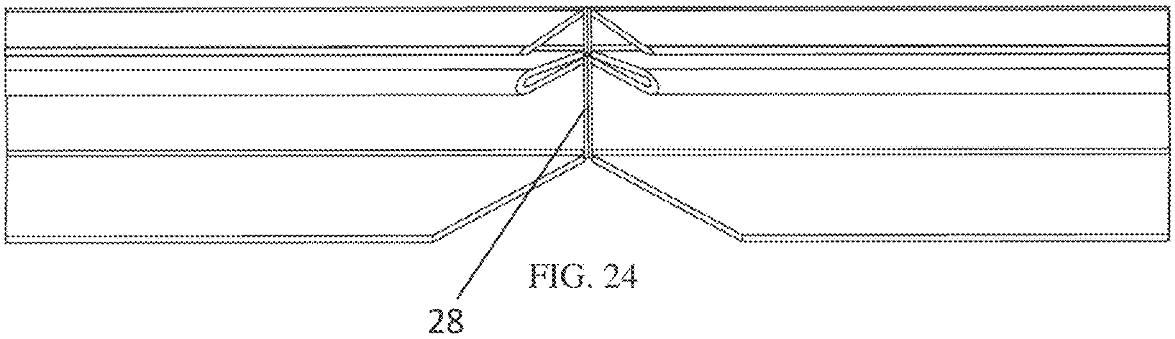
FIG. 24 shows a non-limiting example of a furrow in a frame in accordance with some embodiments of the present invention.
Figure 25:
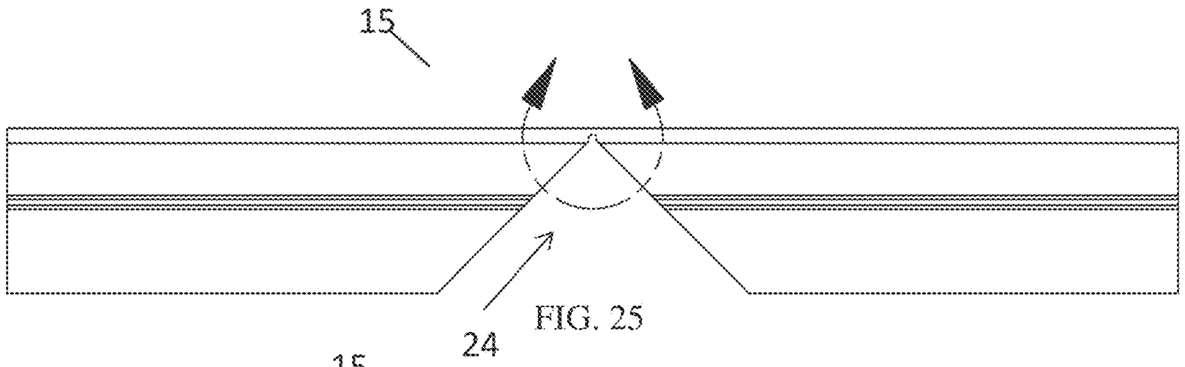
FIG. 25 shows a non-limiting example of a bending movement in a foldable frame in accordance with some embodiments of the present invention.
Figure 26:
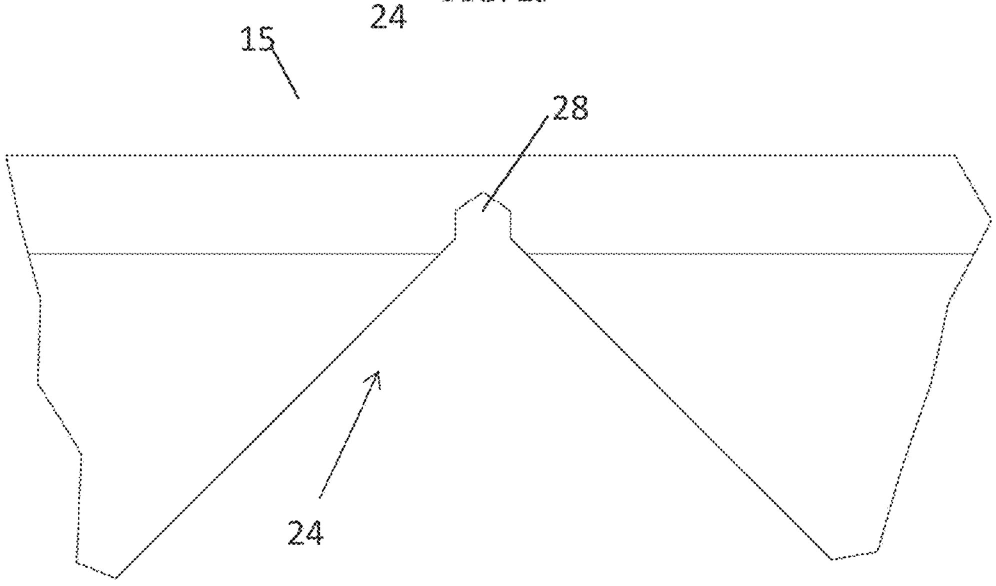
FIG. 26 shows a non-limiting example of a furrow in frame in accordance with some embodiments of the present invention.
Figure 27:
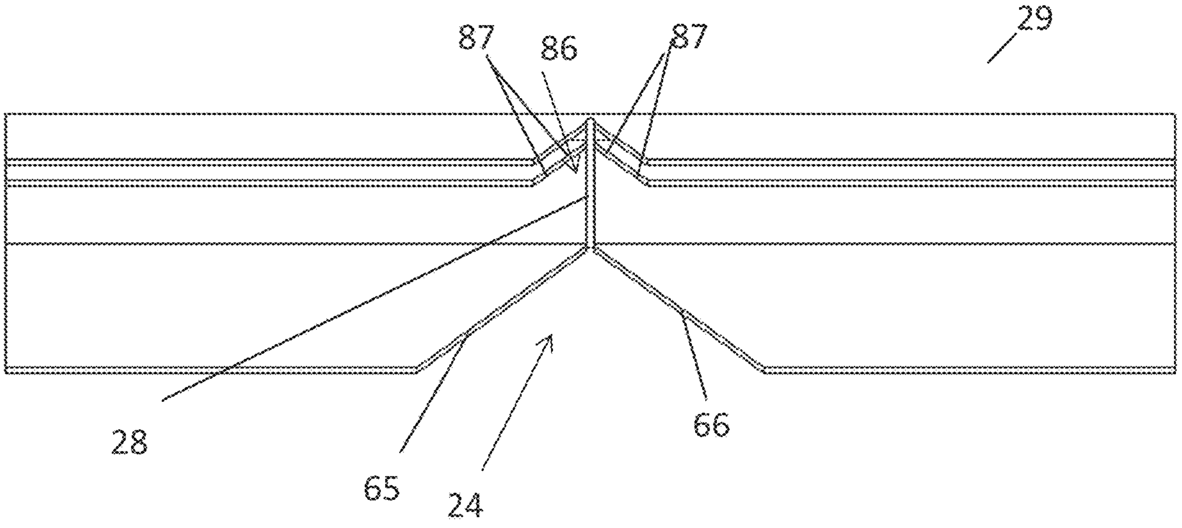
FIG. 27 shows a non-limiting example of an unfolded frame with a furrow in accordance with some embodiments of the present invention.

FIGS. 24-26 show non-limiting examples of a furrow (28) that may aid in the folding of a corner of a folded frame module, 1, perhaps in a preferred area. Embodiments of the present invention may provide a furrow (28) in an elongated single piece of said panel framework. Bending of a framework may start at a furrow (28) and an elongated single piece of panel framework may be bent at a furrow and even around a corner (46) of a rectangular photovoltaic laminate (2) perhaps to create said about 90-degree angle (61) in the framework.

Figure 17:
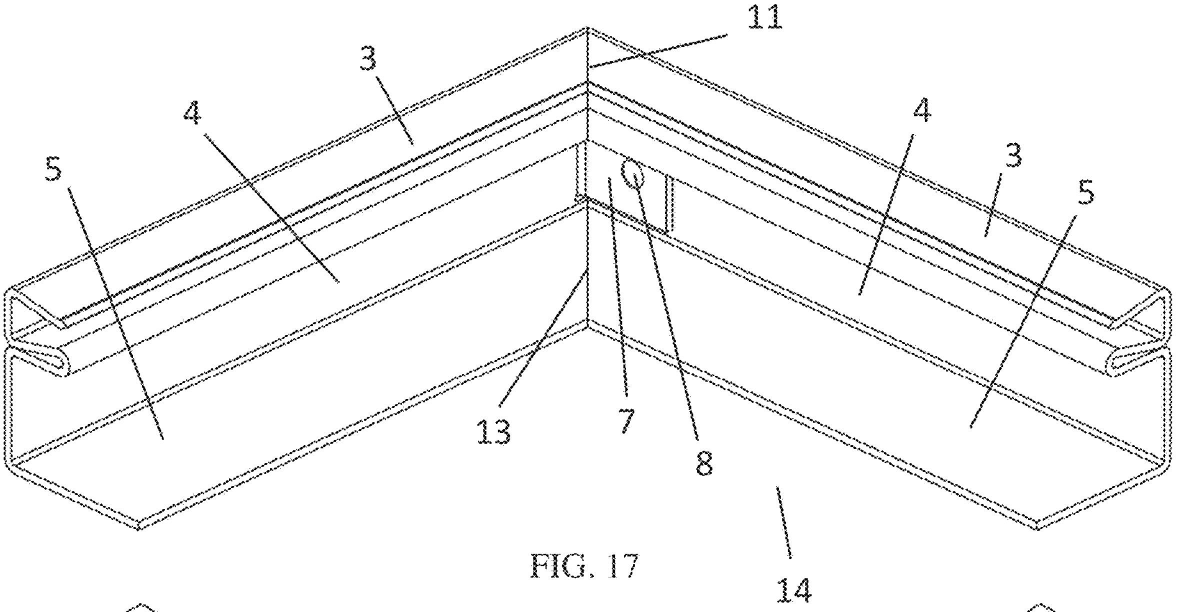
FIG. 17 shows a non-limiting example of a folded frame in accordance with some embodiments of the present invention.
Figure 18:
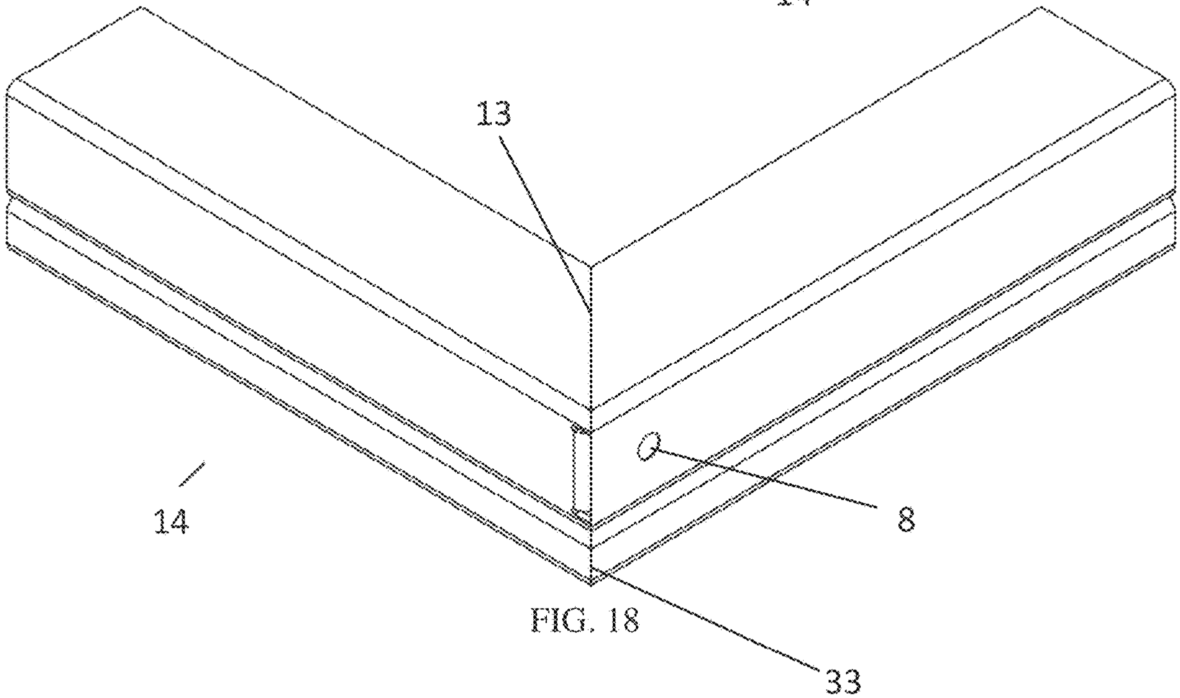
FIG. 18 shows a non-limiting example of a folded frame in accordance with some embodiments of the present invention.
Figure 19:
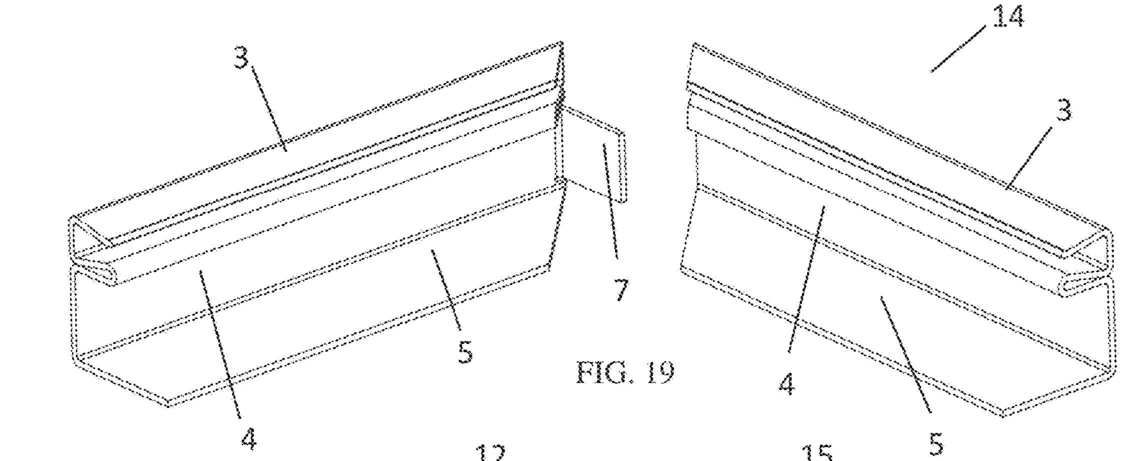
FIG. 19 shows a non-limiting example of an attachment between ends of a frame in accordance with some embodiments of the present invention.
Figure 28:
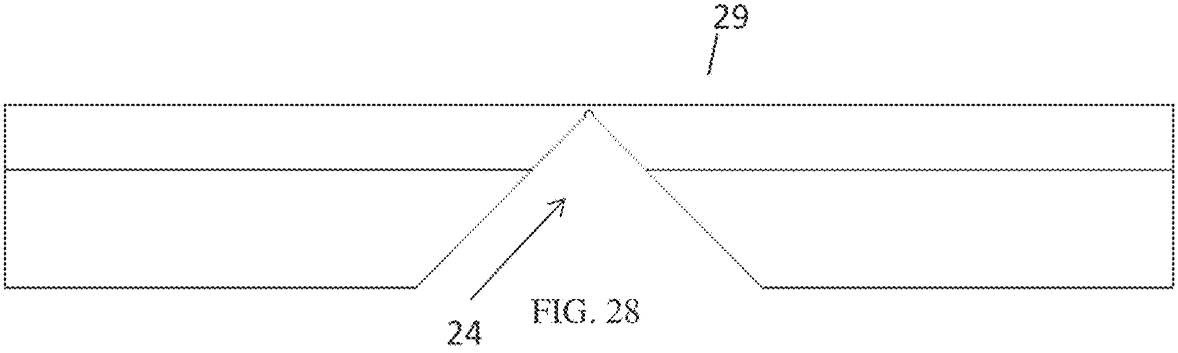
FIG. 28 shows a non-limiting example of an extruded frame in accordance with some embodiments of the present invention.
Figure 29:
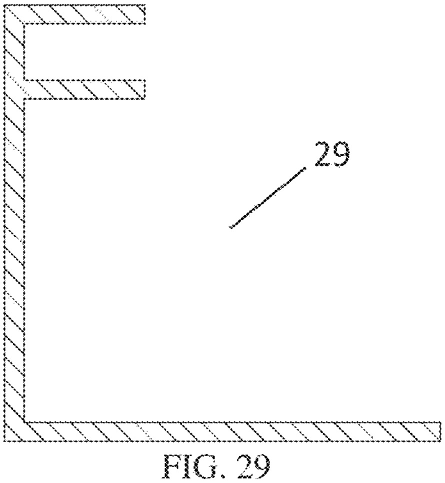
FIG. 29 shows a non-limiting example of an extruded frame in accordance with some embodiments of the present invention.

The folded corners may be used on an extruded frame (29) or other frame perhaps as shown in FIGS. 28 and 29. For a frame join corner (14) perhaps as shown in FIGS. 17-19, the side frame wall (4) may be attached to a frame wall bent lip (7) perhaps with an attachment (8). This may firmly and rigidly attach the two adjoining side frame walls. This attachment may be the two ends of the framework (3). FIG. 19, shows a non-limiting example of the two ends prior to the attachment. The frames may be brought together as the frame join corner (14) and may have a frame corner top join junction (11) and even a bottom frame lip join junction (13) perhaps as shown in FIGS. 17-18.

For a frame join corner (14) perhaps as shown in FIG. 56, the two side frame walls (4) may be joined together with two frame wall bent lips (7). These two frame wall bent lips may be bent towards the inside in the direction of folded frame module (1). For each framework (3), an inside bent angle between each frame wall bent lips (7) and even the side frame wall (4) may be an acute angle.

A corner bracket (31) may be used for the frame join corner (14) perhaps to join the corner as shown FIGS. 31-34. A corner bracket (31) may attach two side frame walls (4). A frame outside join corner (33) may be shown in FIG. 32. A bottom frame lip bracket (32) may not be used. The attachment of the frame side walls (4) may make a strong and rigid corner on the folded frame module. A corner bracket (31) may be added and even secured to a bottom frame lip junction (16) or even a bend corner or the like.

Prior to the corner folding and end attachment, a seal (44) may be attached to laminate edges. A final insertion example may be shown in FIG. 11. For another sealing method, prior to the corner folding and end attachment, a sealant (36) may be applied in a pocket area (21) which may include an inside top sealant area (17) and even an inside bottom sealant area (19) perhaps as shown in FIGS. 11 and 39-41. Some may be applied to an outside top sealant area (18) and even an outside bottom sealant area (20).

When a folded frame (3) may be folded around a laminate (2) and may be secured at the ends, perhaps as shown in FIG. 6, a sealant (36) may squeeze out in the outside top sealant area (18) and even in an outside bottom sealant area (20). A sealant pocket (22) may reduce the amount of sealant (36) in an outside top sealant area (18). Pushing a laminate, close or even against a pocket top area (38) may help.

As may be understood in FIG. 39, a sealant pocket (22) may create a frame top protrusion (43). A frame top protrusion (43) could be reduced or even eliminated if a folded frame (3) material thickness perhaps was reduced at the end as shown in FIGS. 40-41, perhaps with a narrow frame lip, 37.

If a laminate (2) may be forced up or even down, the slanted walls (23) may allow room for a laminate end (40) to flex which may allow for less stress in the laminate perhaps near a pocket top area (38) for up-force on the laminate and even near a pocket bottom area (39) for down-force on the laminate.

Figure 36:
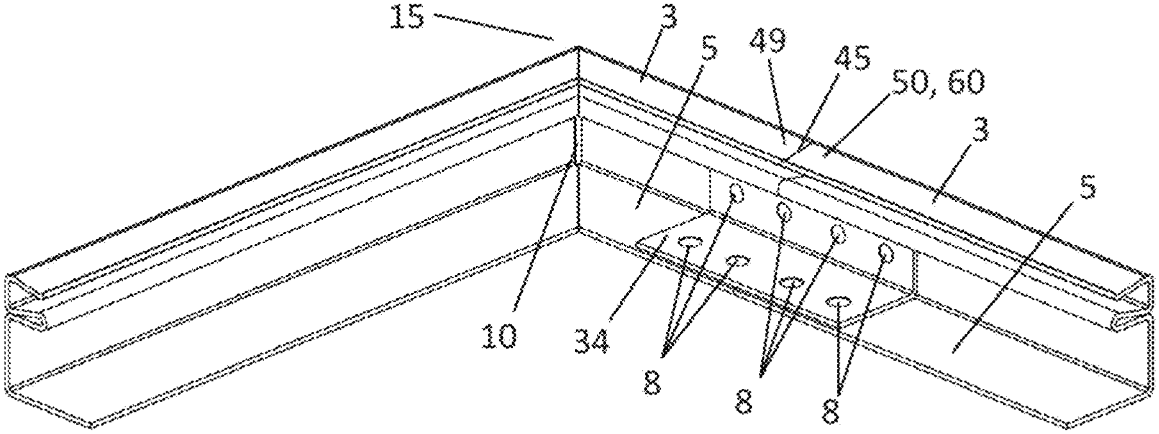
FIG. 36 shows a non-limiting example of a joining of ends along a non-corner in accordance with some embodiments of the present invention.
Figure 37:
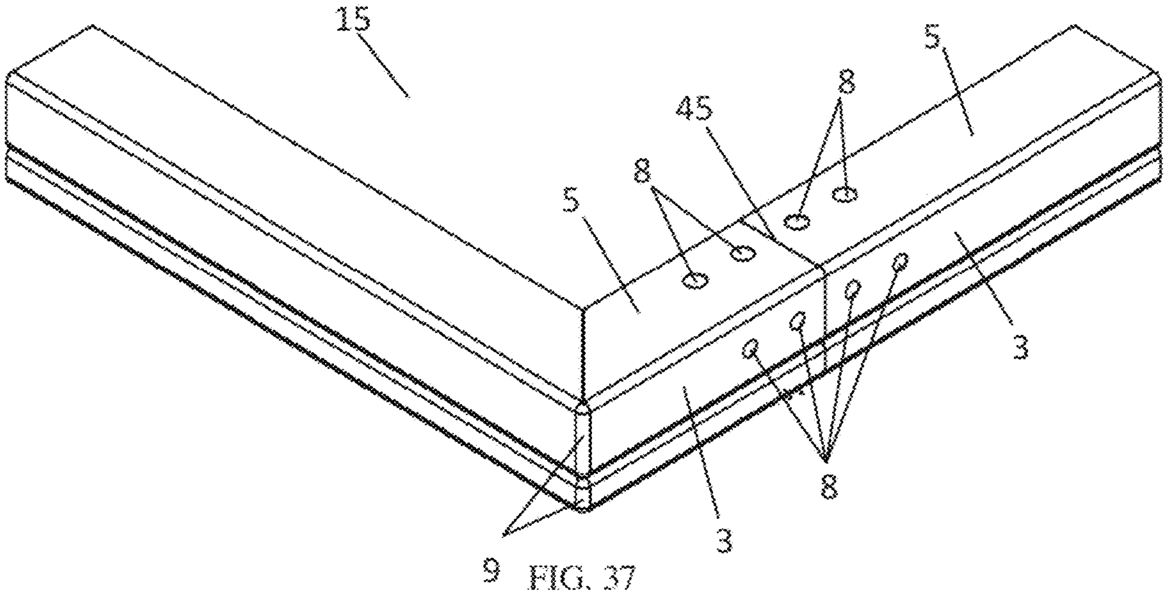
FIG. 37 shows a non-limiting example of a joining of ends along a non-corner in accordance with some embodiments of the present invention.
Figure 38:
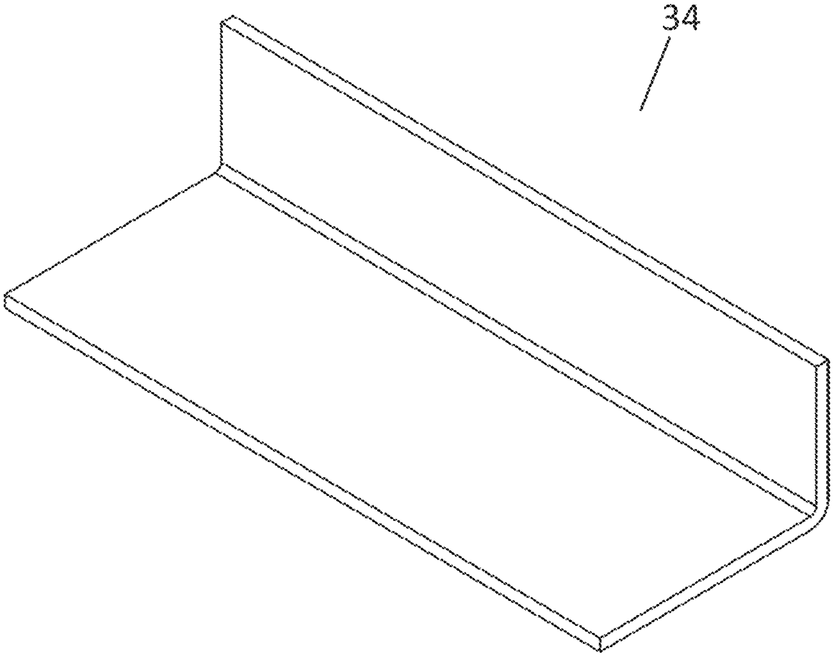
FIG. 38 shows a non-limiting example of a frame mid bracket in accordance with some embodiments of the present invention.

Folded frames, 3, may also be joined along the frame perhaps as shown in FIGS. 35-38. In FIG. 35, a frame lip offset (6) may be attached to a bottom frame lip (5) by an attachment (8) and a frame wall offset (42) may be attached to side frame walls (4) by an attachment (8). A frame mid join junction (45) may be where the top of the folded frames ends may meet. A frame mid bracket (34) may join two folded frame ends at a frame mid join junction (45) perhaps as shown in FIGS. 36-37. A frame mid bracket (34) may be attached by an attachment (8). This may firmly attach the two side frame walls and even the two bottom frame lips firmly together. With a frame mid join junction (45) perhaps all the corners could be frame bend corners (15).

Figure 42:
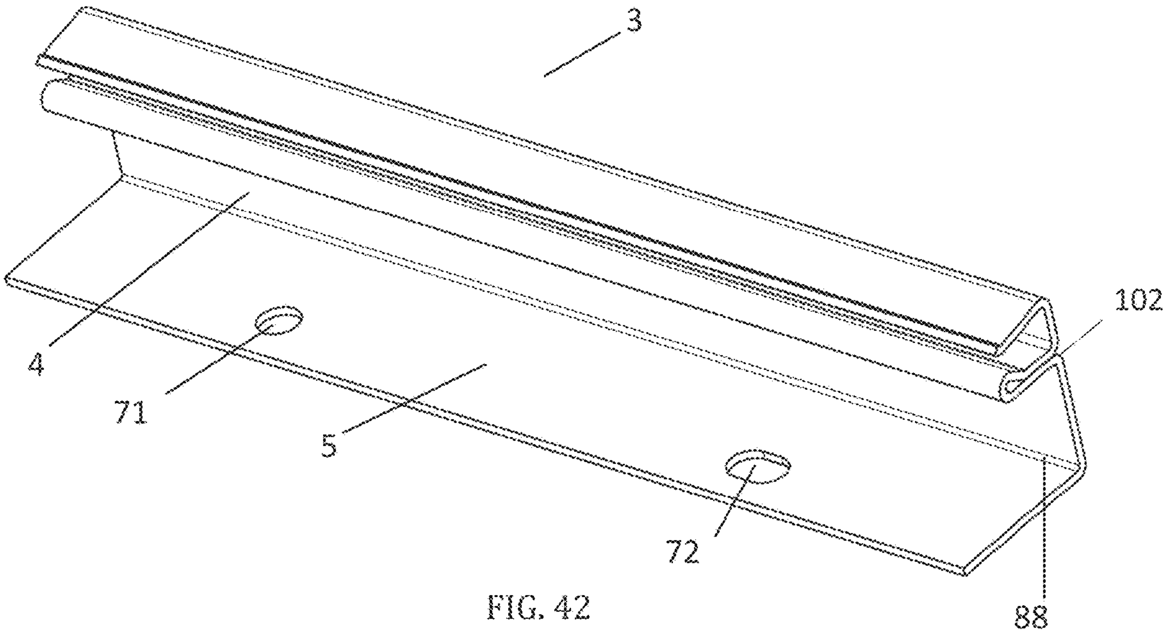
FIG. 42 shows a non-limiting example of a frame having holes or slots in accordance with some embodiments of the present invention.

FIGS. 42-52 show non-limiting examples of a frame-racking (78) perhaps with features that may attach to the framework to a racking (73) FIG. 42 shows non-limiting examples of frame holes (71) and even frame slots (72) that may be used for attaching fasteners between a frame to a racking. A framework may be bent, perhaps horizontally folded, along a horizontal axis of an elongated single piece of framework perhaps along a horizontal fold (88). In some embodiments, a framework may be folded along a second horizontal axis (102) such as creating a second horizontal fold, where a frame fold area (41) and perhaps even a pocket (21) may be located above a side frame wall (4) and a bottom frame lip (5) as may be understood in the non-limiting example in FIGS. 10 and 11. A panel framework may be folded in a direction away from (103) a side frame wall and may be folded in addition or separately in a direction towards (104) a side frame wall. In some embodiments, part of a framework folded in a direction towards a side frame wall may create a fold area top surface (105). A pocket (21) may have a top pocket surface (106), a side pocket surface (107) and a bottom pocket surface which may even be a fold area top surface (105). A side wall frame may be separated from a side pocket surface and may even be substantially coplanar with a side pocket surface.

A folded elongated single piece of panel framework (108) may be created in various embodiments of the present invention. A frame fold area (41) may be panel framework folded over itself which may create a fold area top surface (105) and a fold area bottom surface (109). A frame fold area by be a sandwiched where a fold area top surface may be folded over a fold area bottom surface. In some embodiments, a pocket (21) may form a sideways U shape as may be understood in FIGS. 10 and 11. A sideways U shaped area (110) may be created in a panel framework, perhaps as a second sideways U shape, which may be shaped by a bottom surface (109) of a frame fold area, a side wall frame (4), and a bottom frame lip (5). A pocket sideways U shape may be located above a second sideways U shape in a panel framework.

Embodiments of the present invention may provide a flexible angular projection (76) in a framework perhaps near or even next to a fissure (79). Part of a flexible angular projection may be angled over a fissure. An extrusion may push against the flexible angular projection (76) as it goes through the fissure and perhaps the flexible angular projection may be bent while the extrusion (74) goes through the fissure. The extrusion may be friction locked in the fissure with the flexible angular projection. The extrusion may be deformed, permanently deformed, flexed, or the like when it may be mated with a fissure. After final placement, an extrusion may return to nearly its original form.

Figure 44:
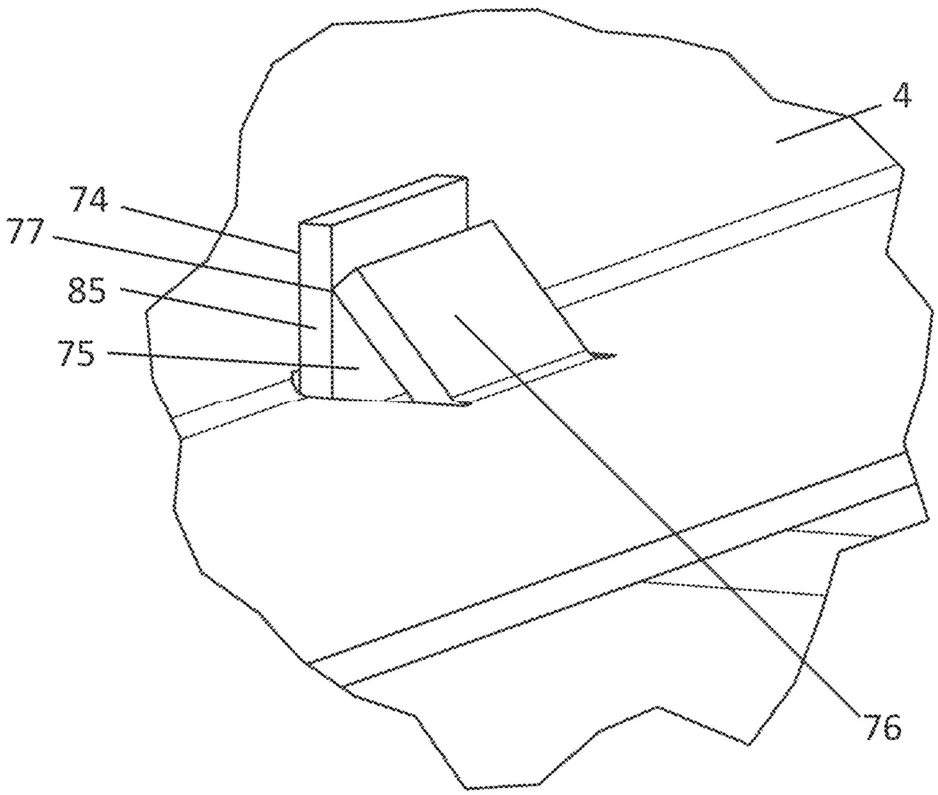
FIG. 44 shows a non-limiting example of a flexible angular protrusion in accordance with some embodiments of the present invention.
Figure 45:
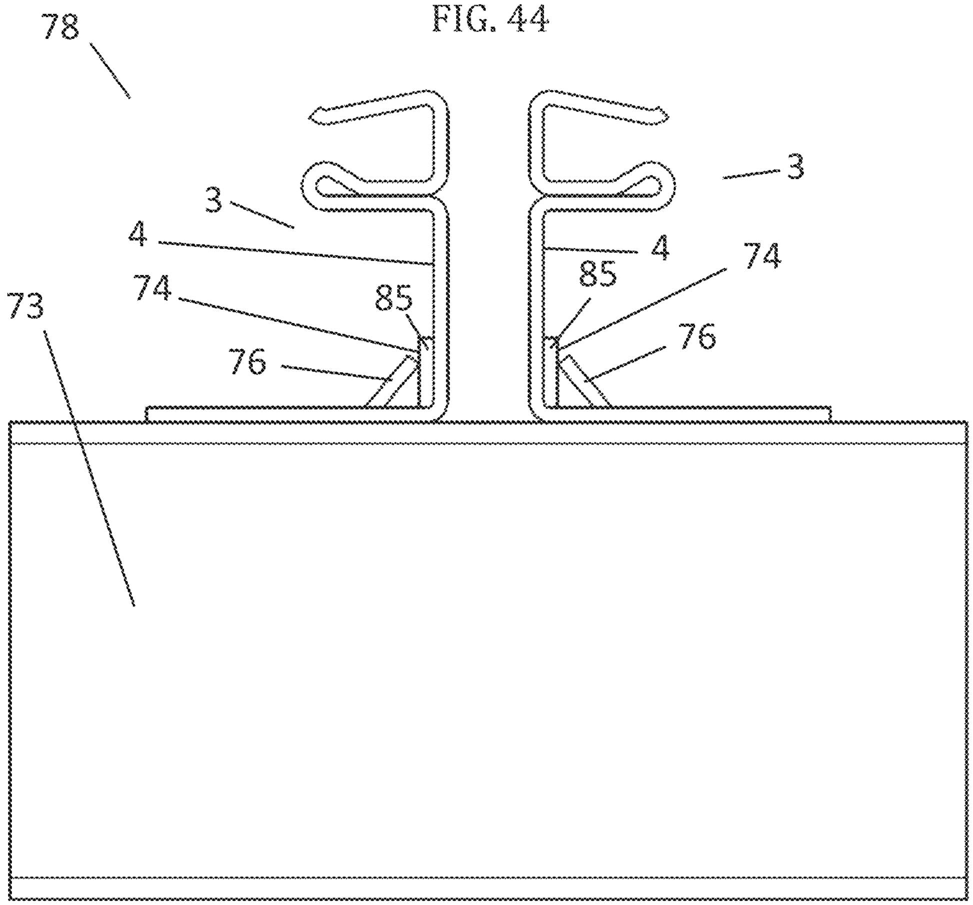
FIG. 45 shows a non-limiting example of an attachment of a frame to a racking in accordance with some embodiments of the present invention.
Figure 46:
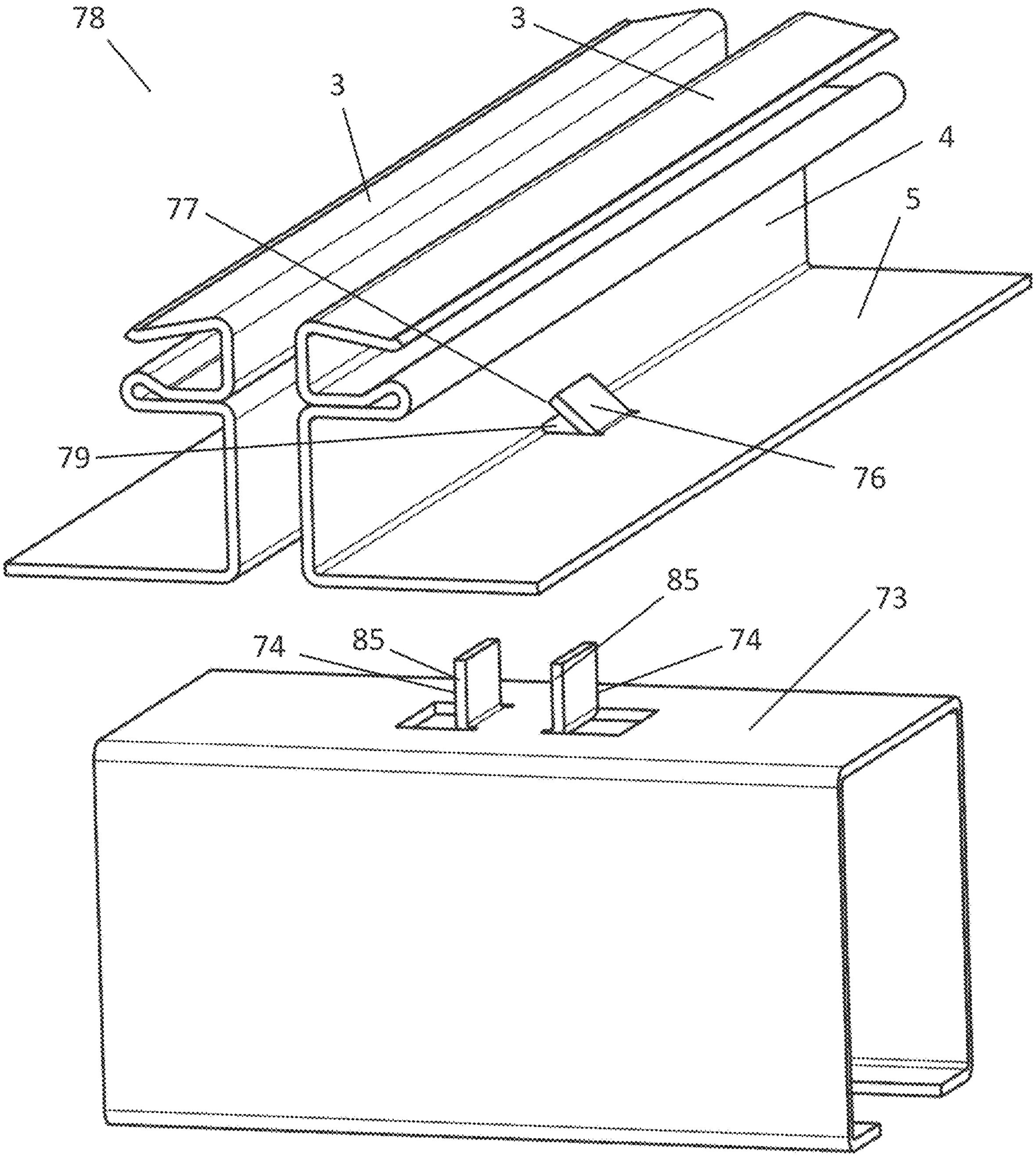
FIG. 46 shows a non-limiting example of an attachment of a frame to a racking in accordance with some embodiments of the present invention.
Figure 47:
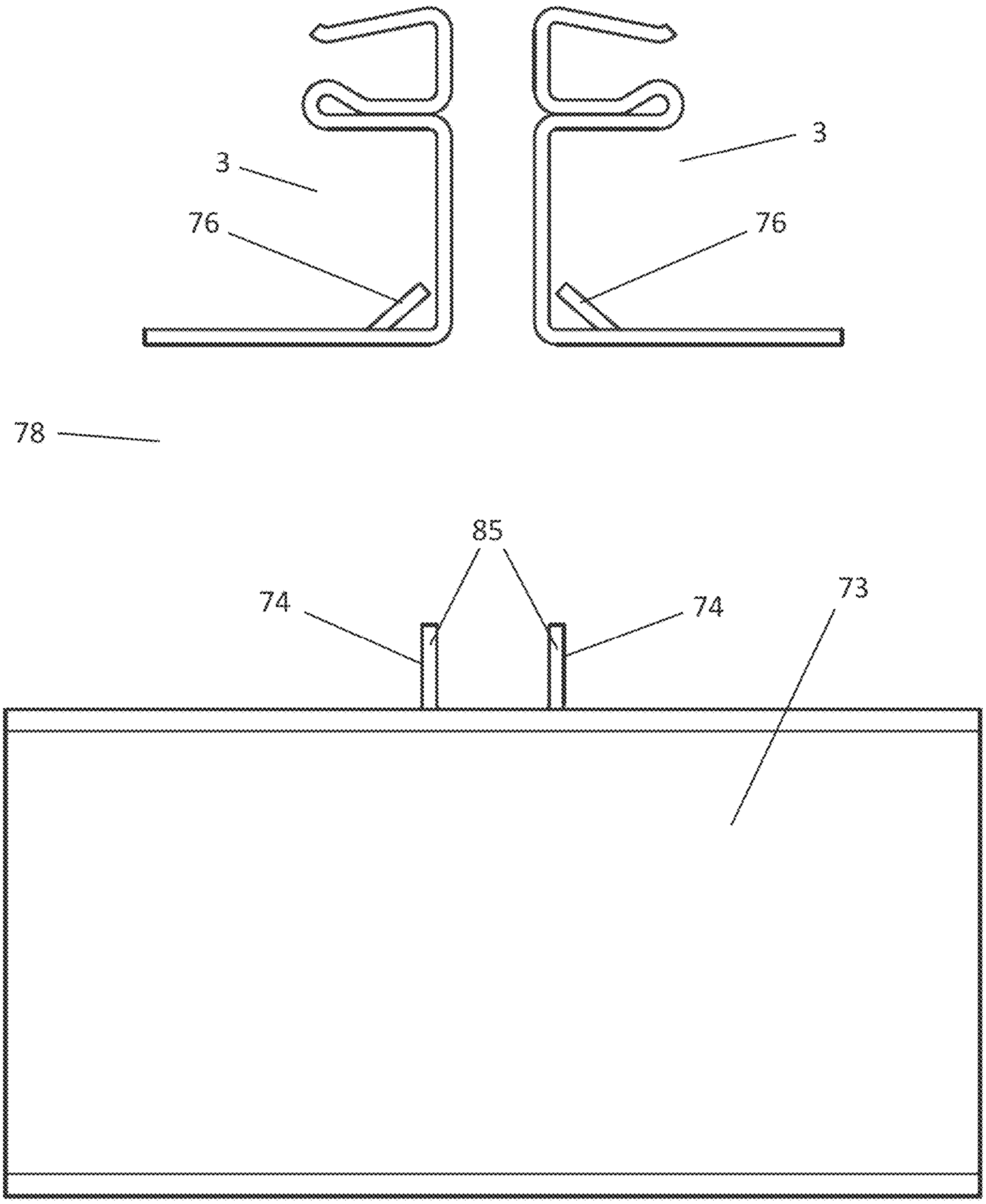
FIG. 47 shows a non-limiting example of an attachment of a frame to a racking in accordance with some embodiments of the present invention.

FIGS. 43-46, show non-limiting examples of a frame-racking (78) perhaps with a slip-lock attachment of the frame (3) to a racking (73). FIG. 46 shows a non-limiting example of a frame-racking (73) with the frame openings (79) on the folded frames (3) aligned but perhaps not pushed on the racking tabs (74). When the frames may be pushed down, the racking tabs (74) may go through a frame opening (79). A frame spring tab (76) may be deflected and may force the racking tabs (74) against a side frame wall (4).

Figure 43:
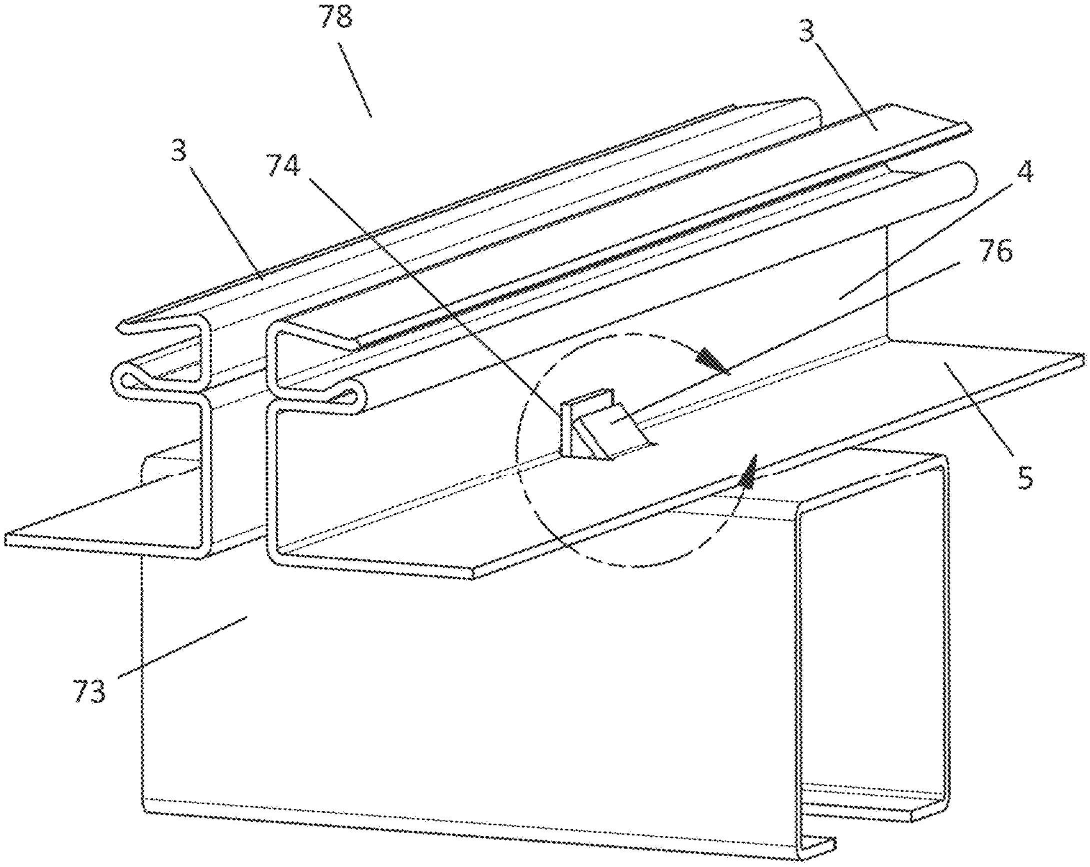
FIG. 43 shows a non-limiting example of an attachment of a frame to a racking in accordance with some embodiments of the present invention.

A final attached position may be shown in FIGS. 43-45. By pushing a folded frame on the racking tabs (74), frame spring tabs (76) may be deflected. This may put a high contact force between a frame spring tab edge (77) and a racking tab surface (75). An angled frame spring tab (76) may allow a frame spring tab (76) to slide in but may require a large force to pull it out. Pulling it out may cause a frame spring tab edge (77) to dig further into a racking tab surface (75) and may increase the force required to pull a folded frame away from a racking. An additional groove or even ribs on racking tab surface (75) may increase the pull out force. This may securely attach a folded frame to a racking.

A frame spring tab (76) and racking tab (74) may be located anywhere on the bottom frame lip (5) and there may be multiple spring tabs. Spring tab may be located on a racking tab end face (85). A contact between the frame spring tab (76) and a racking tab (74) may create an electrical ground path between a folded frame (3) and a racking (73), thus an electrically grounded contact between a framework and a racking may be created.

Figure 48:
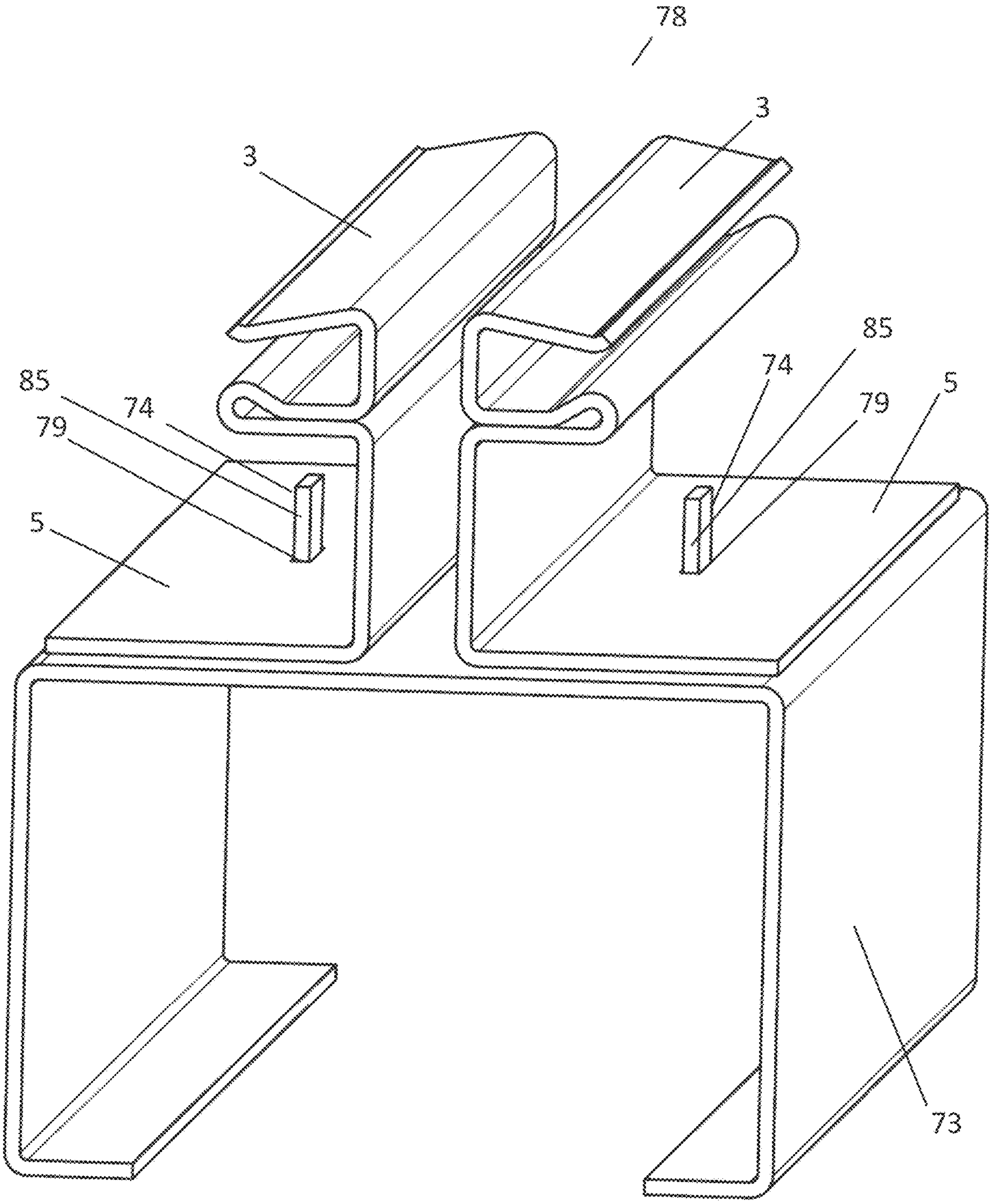
FIG. 48 shows a non-limiting example of an attachment of a frame to a racking in accordance with some embodiments of the present invention.

Embodiments of the present invention may provide a fissure (79) in a framework where an extrusion (74) in a racking may be mated through the fissure perhaps to secure a framework with a racking. A fissure may be an opening a frame. FIG. 48, shows a frame-racking (78) perhaps with an extrusion such as racking tabs (74) in a fissure (79). A fissure (79) may be slightly larger than racking tabs (74) perhaps so the folded frame may be easily inserted on a racking. Once in place, racking tabs (74) can be deformed perhaps by bending, twisting, dimpling, embossing, or any other type of deforming, or the like. Racking tabs may be prevented from being removed through the fissure (79) perhaps with a pin, wedge, through or even on a side of a racking tab or perhaps with a swaged collar or even sleeve pressed over or even swaged around a racking tab. Deformation as added parts may prevent a folded frame from being removed from a racking which may effectively attach the frame to the racking. A special tool may be used to easily deform the racking tabs.

A deformation may create a contact between a fissure (79) and a racking tab (74) which may create an electrical ground path between the folded frame and the racking.

Figure 49:
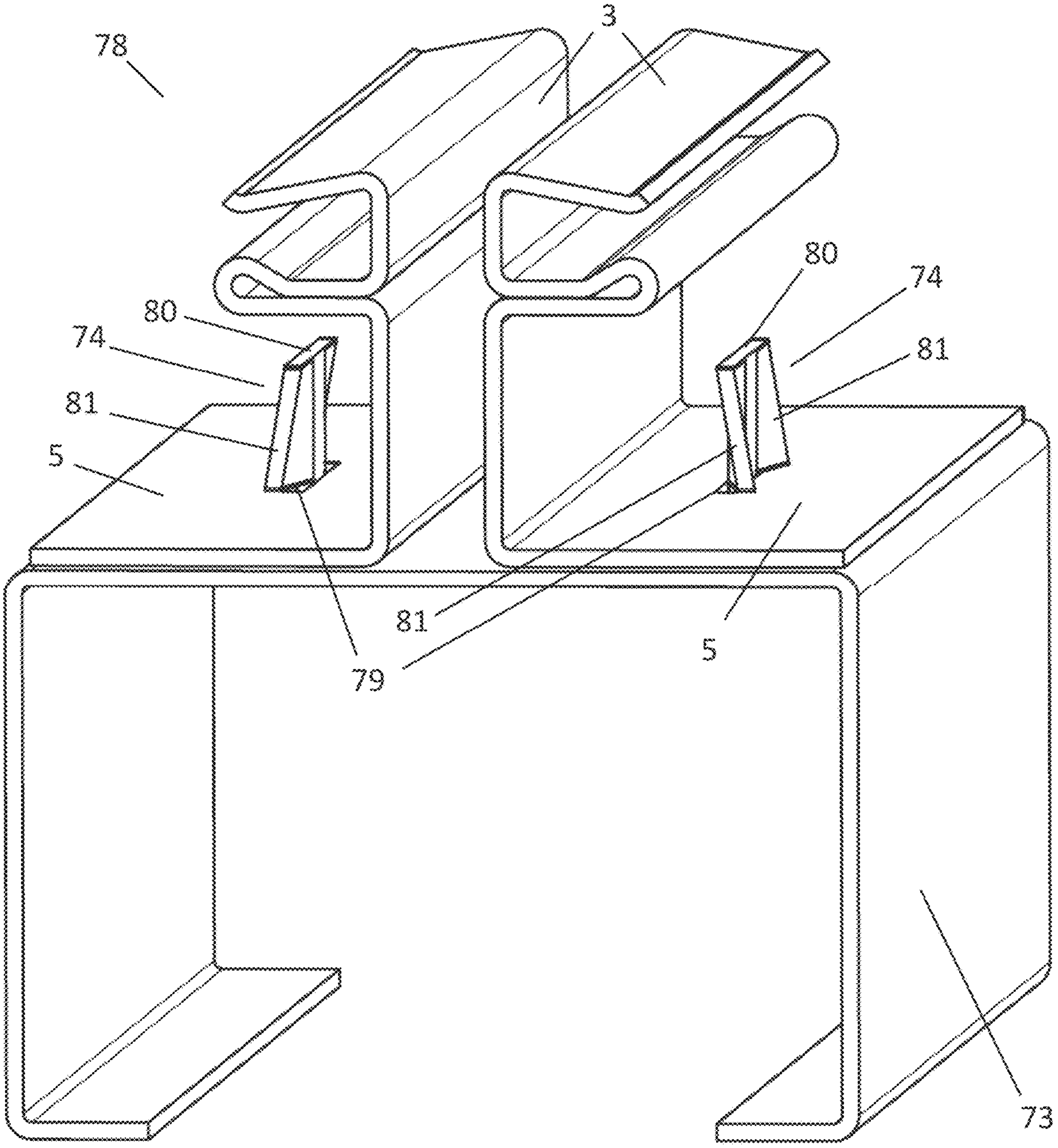
FIG. 49 shows a non-limiting example of an attachment of a frame to a racking in accordance with some embodiments of the present invention.
Figure 50:
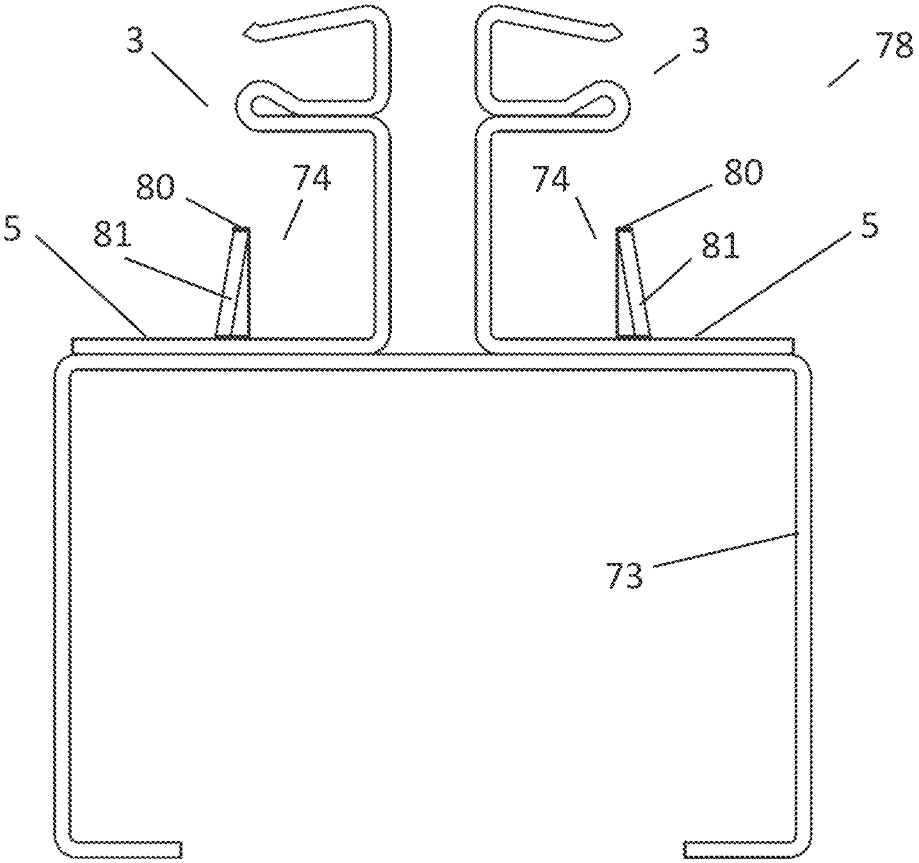
FIG. 50 shows a non-limiting example of an attachment of a frame to a racking in accordance with some embodiments of the present invention.
Figure 51:
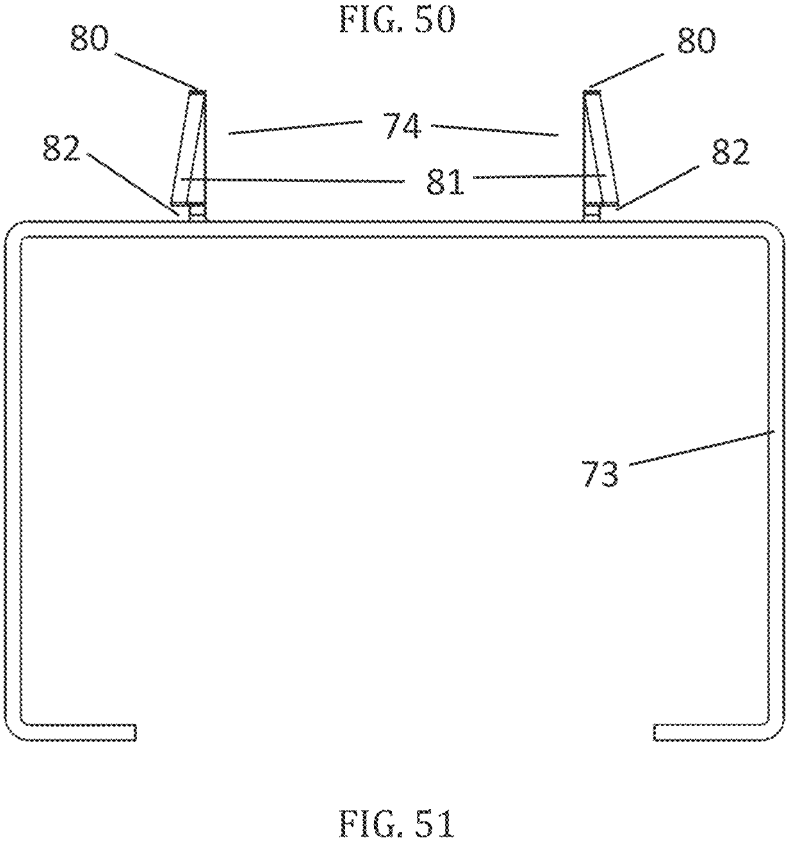
FIG. 51 shows a non-limiting example of a racking tab top in accordance with some embodiments of the present invention.
Figure 52:
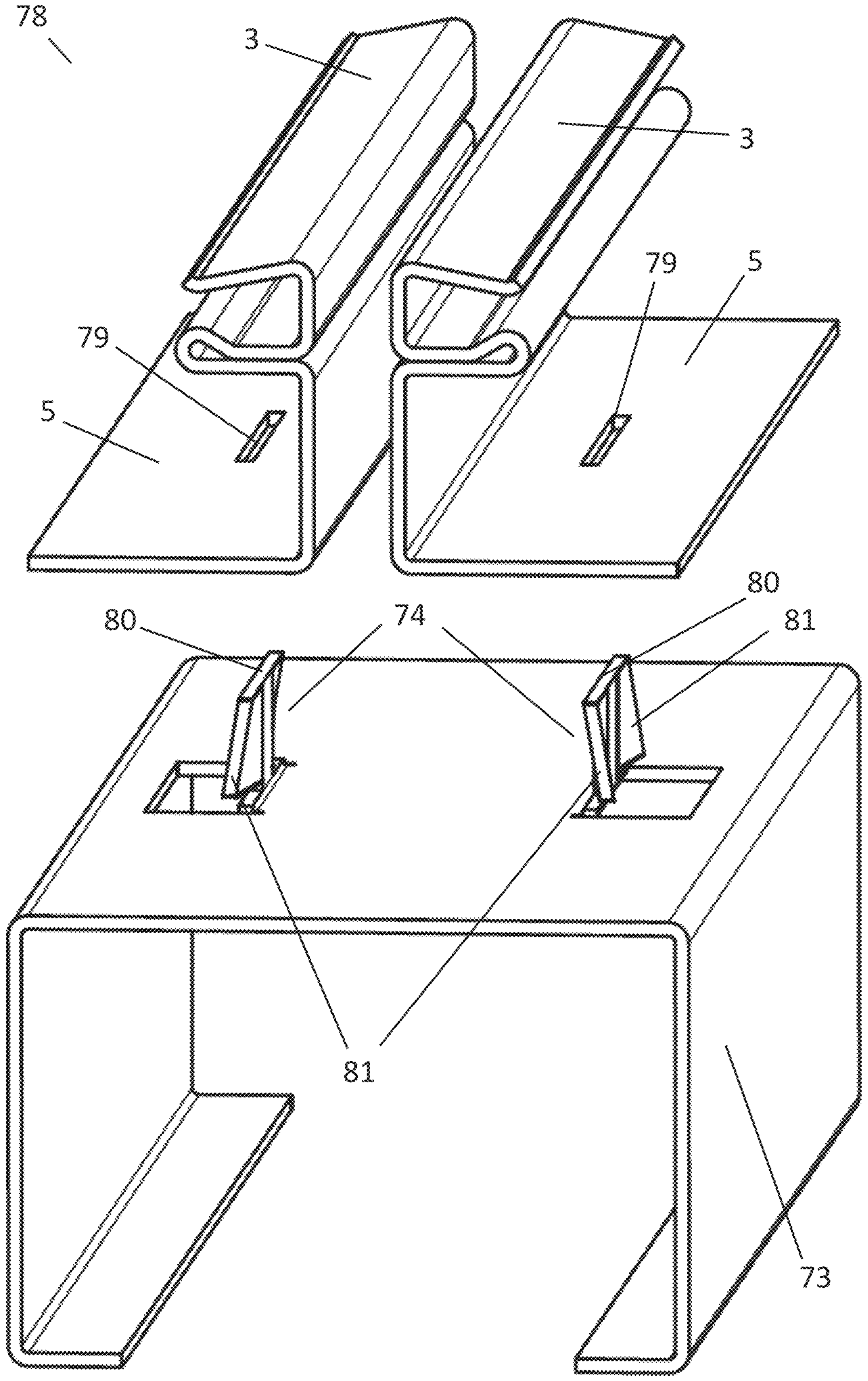
FIG. 52 shows a non-limiting example of an attachment of a frame to a racking in accordance with some embodiments of the present invention.

FIGS. 49-52 show a non-limiting example of a frame-racking (78) perhaps with a push-snap attachment of a frame to a racking. FIG. 52 shows an example of a frame-racking with fissures (79) on the folded frames that may be aligned but not pushed on the racking tabs. FIGS. 49-50 show a non-limiting example of a position when a folded frame may be attached to a racking.

A racking tab top (80) may fit into a fissure (79). As a folded frame may be pushed further on a racking tab (74), racking bent tab sides (81) which may be spring side tabs may be bent back perhaps with the sides or edges of a fissure (79). When the folded frame may be near or even substantially against a racking, the racking bent tab side (81) may partially or even fully spring back perhaps when reaching a racking tab relief (82). This may not allow the racking tabs (74) to slip back out the fissure (79). A folded frame may be securely attached to the racking.

Racking tabs (74) may be shaped, bent, dimpled, or the like that could spring back after going through a fissure (79). Any frame spring tab (76) or similar feature that may spring back to a position to lock a formed frame may be considered a push-snap attachment. A spring action may be in a frame opening. A contact between a frame opening and a racking tab may create an electrical ground path between the folded frame and the racking.

Figure 53:
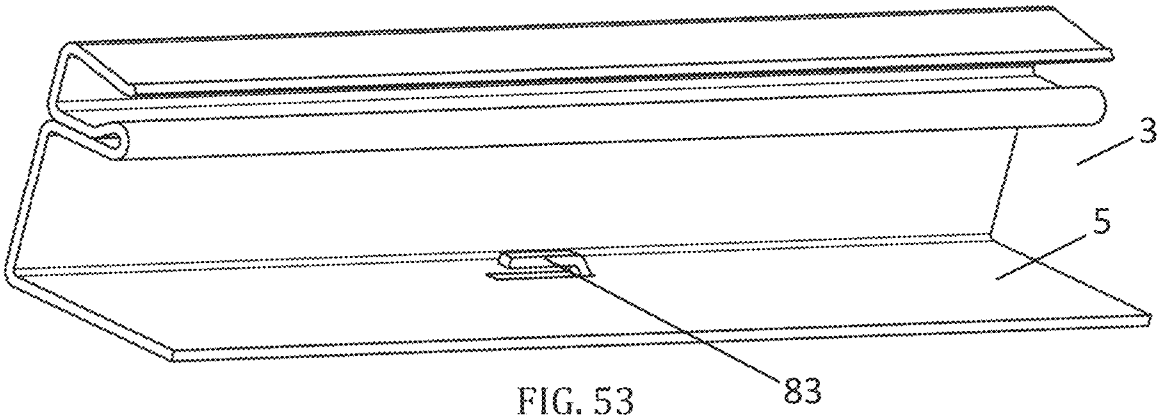
FIG. 53 shows a non-limiting example of an adjustable fastener in accordance with some embodiments of the present invention.
Figure 54:
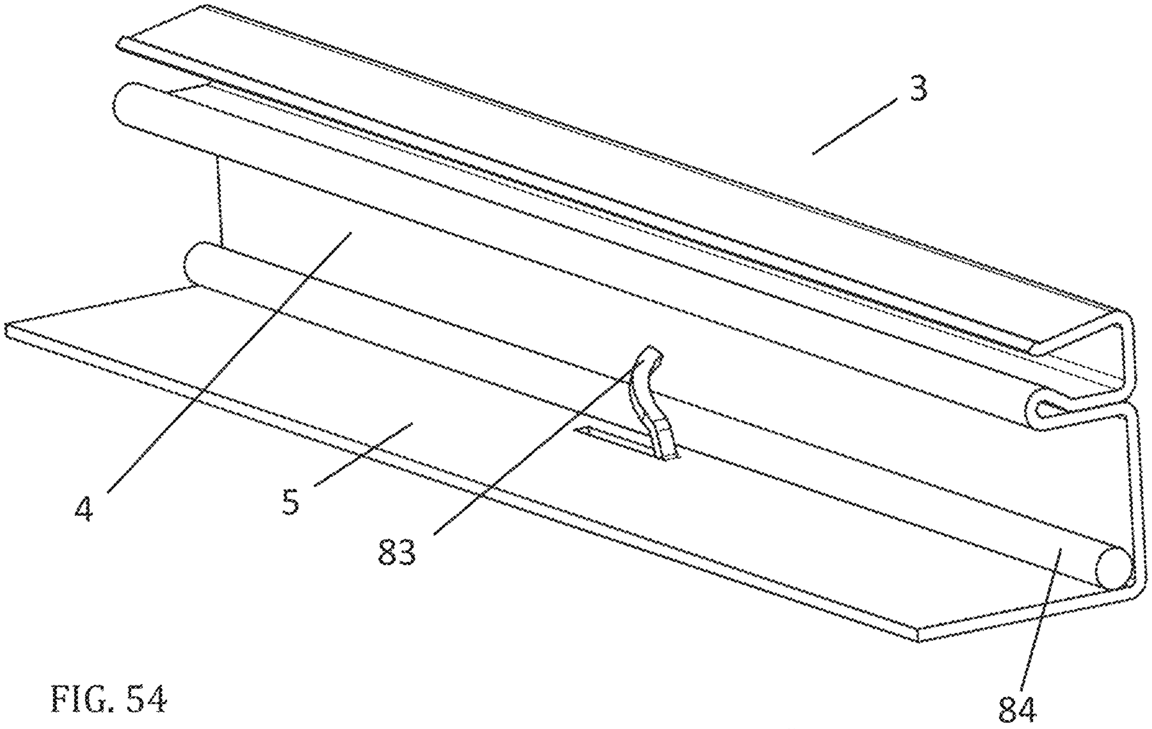
FIG. 54 shows a non-limiting example of attachment of a cable to a frame in accordance with some embodiments of the present invention.
Figure 55:
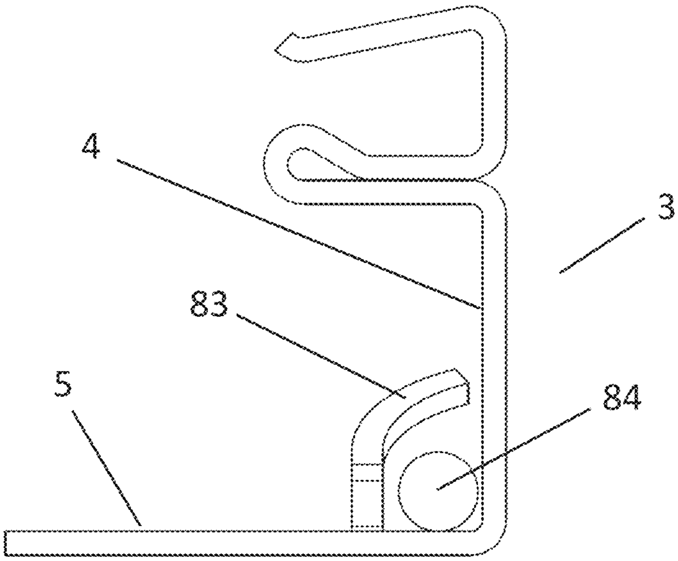
FIG. 55 shows a non-limiting example of attachment of a cable to a frame in accordance with some embodiments of the present invention.

FIGS. 53-55 show non-limiting examples of features to retain a cable inside a frame. FIG. 53 shows a non-limiting example of an adjustable fastener (83) which may be an a integrated cable finger. An adjustable fastener (83) may be lifted and even bent around a solar power cable (84) perhaps as shown in FIGS. 54-55 to secure the cable to the framework.

Embodiments of the present invention may provide a folded frame or framework which may be attached at a frame fold area (41) perhaps as shown in FIGS. 10 and 11. An attachment may be, but not is limited to, spot welding, welding, brazing, soldering, epoxy, or other attachment, or the like. This may be continuous, intermittent, localized, or the like. This attachment may increase the rigidity and strength of a folded frame module.

FIGS. 9, 13-14, 17-19, 31-32, and 56 show a non-limiting example of a frame join corner (14) and FIGS. 8, 12, 15-16, 20-26, 30, and 35-37 show a non-limiting example of a frame bend corner (15). FIGS. 28 and 28 may also be a frame bend corner (15).

In a folded frame module, the corners may be a frame join corner or even a frame bend corner. A frame join corner or even a frame bend corner may make the folded frame module rigid and strong.

An attachment (8) as may be understood in FIGS. 2, 4, 8-9, 12-14, 17-18, 30-32, 35-37 and 56, may include but is limited to, welded, spot welded, soldered, brazed, crimped, swaged, screwed, bolted, riveted or the like. An attachment may be in multiple attach areas (8) perhaps in multiple locations.

FIGS. 10, 11, and 38-41, show a non-limiting example of a folded frame in a shape. A shape may vary perhaps due to the holding of the laminate, a strength, its rigidity or other reasons or the like. As such a framework does not need to be rectangular, it can be various shapes with varying types of angles corners and all are included in this disclosure.

A folded frame may be one layer or may be multiple layers. Each layer may follow the same folds or may even be folded differently.

Components shown and discussed herein may be one piece but may be made with multiple components and these multiple components could be made of different materials. Multiple components could be combined into one component.

Different features are discussed in various embodiments of the present invention and are can be used with individual folded frame modules, extruded frames such as shown in FIGS. 28 and 29, any type of folded frame with an insert, or the like.

An attachment and other retaining features may be formed with little additional costs to a folded frame. These features may reduce component costs and installation costs which my significantly reduce the overall costs on the solar costs.

The attachment features on a folded frame and a racking perhaps as shown in FIGS. 43-52, could be reversed. The attachment features on a folded frame could be on a racking and even the attachment features on a racking could be on a folded frame.

FIGS. 43-52 show a non-limiting example of racking tabs as formed on a racking. Racking tabs could be a separate piece perhaps attached to a racking. Racking tabs may be rigidly attached or may even be allowed to move in a direction which may allow adjustment perhaps to aid in the placement of a racking tab into a frame opening. Racking tabs may be secured rigidly perhaps after a racking tab may be aligned to or even inserted on a frame opening. An adjustment of a racking tab may be include but is not limited to slotted holes in a racking tab, grooves in a racking, or other features, or the like. There may be both fixed and even adjustment racking tabs on a single frame.

FIGS. 43-52 show a non-limiting example of a racking (73) as a channel. Racking may be any type of racking. FIGS. 43-52, show non-limiting example two frames on a racking, but a single racking may have only one frame. There may be multiple frames on each racking. There may be multiple racking attached to a frame. There may be multiple frames on each racking.

Racking tabs perhaps as shown in FIGS. 43-52 may have a shape including but not limited to, square, rectangular, trapezoidal, tapered, tapered edges, rounded edges, or any other shape, or the like. This may aid in the insertion of racking tabs into a frame opening or deflecting a frame spring tab or the like. A tool may be used to remove a frame from a racking. Frame wall bent lips perhaps as shown in FIG. 56, may be joined together such as but not limited to, pins and wedges through or sleeves or collars press fit swaged around, or any other added part to join them together, or the like.

The above discussion includes both information known to the art prior to the filing date and information forming part of the present inventive disclosure. Inclusion of any statement in this application, whether as a characterization of a published reference or in a discussion of technical problems and their solutions, is not to be taken as an admission that such statement is prior art.

While the invention has been described in connection with some preferred embodiments, it is no intended to limit the scope of the invention to the particular form set forther, but on the contrary, it is intended to cover such alternatives, modifications, and equivalents as may be included within the spirit and scope of the invention as defined by the statements of inventions.

Examples of alternative claims may include:

1. A method for enclosing a solar panel comprising the steps of:
 providing an elongated single piece of panel framework;
 bending said elongated single piece of said panel framework around a corner of a rectangular photovoltaic laminate to create an about 90-degree angle in said elongated single piece of said panel framework;
 placing said bent elongated single piece of panel framework around said corner of said photovoltaic laminate; and
 creating at least a partial frame around said corner of said rectangular photovoltaic laminate with said bent elongated single piece of panel framework.

2. The method according to clause 1 or any other clause, and further comprising a step of providing a furrow in said elongated single piece of said panel framework; and
 wherein said step of bending said elongated single piece of said panel framework around a corner of said rectangular photovoltaic laminate to create said about 90-degree angle in said elongated piece of said panel framework comprises a step of bending said elongated single piece of said panel framework at said furrow and around said corner of said rectangular photovoltaic laminate to create said about 90-degree angle in said elongated single piece of said panel framework.

3. The method according to clause 1 or 2 or any other clause, wherein said elongated single piece of said panel framework comprises a first end and a second end.

4. The method according to clause 3 or any other clause, wherein said elongated single piece of said panel framework comprises a length of about a perimeter of said rectangular photovoltaic laminate.

5. The method according to clause 1 or any other clause, and further comprising the steps of:
 bending said elongated single piece of said panel framework at three different positions in said elongated single piece of said panel framework to create three about 90-degree angles at each of said positions;
 creating a rectangular panel framework from said elongated single piece of panel framework with said three about 90-degree angles,
 enclosing said rectangular panel framework around said rectangular photovoltaic laminate wherein each of said three about 90-degree angles encase a corresponding corner of said rectangular photovoltaic laminate; and connecting a first end of said elongated single piece of to a second end of said elongated single piece of said panel framework.

6. The method according to clause 1 or any other clause, and further comprising a step of connecting a first end of a first panel framework to an end of a second panel framework to form a rectangular panel framework.

7. The method according to clause 5 or 6 or any other clause, wherein said step of connecting ends of a panel framework comprises a step of connecting said ends of said panel frameworks at a corner.

8. The method according to clause 7 or any other clause, wherein said step of connecting said ends of said panel frameworks comprises the steps of:

providing a first attachment protrusion at a first end of said panel framework;

providing a second attachment protrusion at a second end of said panel framework or an end of a second panel framework;

placing said first end to said second end to create a corner; and joining said first attachment protrusion at said first end with said second attachment protrusion at said second end.

9. The method according to clause 4 or any other clause, and further comprising the steps of:

bending said elongated single piece of said panel framework at four different positions in said elongated single piece of said panel framework to create four about 90-degree angles at each of said positions;

creating a rectangular panel framework from said elongated single piece of panel framework with said four about 90-degree angles;

enclosing said rectangular panel framework around said rectangular photovoltaic laminate wherein each of said four about 90-degree angles encase a corresponding corner of said rectangular photovoltaic laminate; and connecting a first end of said elongated single piece of to a second end of said elongated single piece of said panel framework at a non-corner.

10. The method according to clause 6 or any other clause, wherein said step of connecting ends of a panel framework comprises a step of connecting said ends of said panel frameworks at a non-corner.

11. The method according to clause 5 or 6 or any other clause, wherein said step of connecting said first end to said second end further comprises a step chosen from:

connecting said first end to said second end by overlapping edges of each end; and connecting said first end to said second end at a junction and adding a bracket over said junction.

12. The method according to clause 1 or any other clause, wherein said elongated single piece of said panel framework comprises a side frame wall and a bottom frame lip; wherein said bottom frame lip is located perpendicular to said side frame wall.

13. The method according to clause 12 or any other clause, and further comprising a step of providing a notch in said bottom frame lip of said elongated single piece of said panel framework.

14. The method according to clause 13 or any other clause, and further comprising the steps of:

placing said notch below where said about 90-degree angle will be created in said step of bending said elongated single piece of said panel framework around said corner of a rectangular photovoltaic laminate to create an about 90-degree angle in said elongated single piece of said panel framework; and meeting said edges of said notch in said bottom frame lip to create a bottom frame lip bend junction when said about 90-degree angle in said elongated single piece of said panel framework is created.

15. The method according to clause 14 or any other clause, and further comprising a step of securing said bottom frame lip bend junction.

16. The method according to clause 15 or any other clause, wherein said step of securing said bottom frame lip junction comprises a step of overlapping an offset of said bottom frame lip.

17. The method according to clause 15 or any other clause, wherein said step of securing said bottom frame lip junction comprises the steps of:

providing a first attachment protrusion at a first edge of said notch in said bottom frame lip;

providing a second attachment protrusion at a second opposite edge of said notch in said bottom frame lip; and joining said first attachment protrusion at said first edge with said second attachment protrusion at said second edge when said bottom frame lip junction is created.

18. The method according to clause 15 or any other clause, wherein said step of securing said bottom frame lip junction comprises a step of adding a corner bracket to said bottom frame bend lip junction.

19. The method according to clause 1 or any other clause, and further comprising a step of attaching said framework to a racking.

20. The method according to clause 19 or any other clause, wherein said step of attaching said framework to said racking comprises the steps of:

providing a fissure in said framework;

providing an extrusion in said racking;

mating said extrusion through said fissure in said framework; and securing said framework to said racking with said extrusion in said fissure.

21. The method according to clause 20 or any other clause, and further comprising the steps of:

providing a flexible angular projection in said framework near said fissure;

pushing against said flexible angular projection with said extrusion as said extrusion goes through said fissure;

bending said flexible angular projection while said extrusion goes through said fissure; and friction locking said extrusion in said fissure with said flexible angular projection.

22. The method according to clause 20 or any other clause, and further comprising the step of deforming said extrusion when mating with said fissure.

23. The method according to clause 20 or any other clause, wherein said extrusion in said racking flexes when mating with said fissure in said framework and then returns to near an original form after said mating with said fissure.

24. The method according to clause 19 or any other clause, wherein said step of attaching said framework to said racking comprises a step of creating an electrically grounded contact between said framework and said racking.

25. The method according to clause 1 or any other clause, and further comprising the steps of: providing an adjustable fastener in said framework;

placing a solar power cable in said framework; and securing said solar power cable to said framework by adjusting said adjustable fastener said framework to secure said cable to said framework.

26. The method according to clause 1 or any other clause, wherein said elongated single piece of said panel framework comprises a side frame wall and a top frame lip, wherein said top frame lip comprises a notch;

and further comprising the steps of:

placing said notch above where said about 90-degree angle will be created in said step of bending said elongated single piece of said panel framework around said corner of a rectangular photovoltaic laminate to create an about 90-degree angle in said elongated single piece of said panel framework; and meeting edges of said notch in said top frame lip to create a top frame lip junction when said about 90-degree angle in said elongated single piece of said panel framework is created.

27. The method according to clause 1 or any other clause, wherein said elongated single piece of panel framework is at least partially prefolded.

28. The method according to clause 1 or any other clause, and further comprising a step of bending said elongated single piece of framework along a horizontal axis.

29. The method according to clause 28 or any other clause, and further comprising a step of bending said elongated single piece of framework along a horizontal fold in said elongated single piece of framework.

30. A method for enclosing a panel comprising:

providing an elongated single piece of panel framework having a first end and a second end, wherein said elongated single piece of said panel framework comprises a length of about a perimeter of a rectangular photovoltaic laminate;

bending said elongated single piece of said panel framework at three different positions in said elongated single piece of said panel framework to create three about 90-degree angles at each of said positions;

creating a rectangular panel framework from said elongated single piece of panel framework with said three about 90-degree angles;

enclosing said rectangular panel framework around said rectangular photovoltaic laminate wherein each of said three 90-degree angles encase a corresponding corner of said rectangular photovoltaic laminate; and connecting said first end with said second end of said elongated single piece of said panel framework.

31. A structure comprising:

an elongated single piece of panel framework;

a bend area in said elongated single piece of said panel framework capable of being bent around a corner of a rectangular photovoltaic laminate to create an about 90-degree angle in said elongated single piece of said panel framework; and at least a partial frame formed around said corner of said rectangular photovoltaic laminate with said bent elongated single piece of panel framework.

32. The method according to clause 5 or 6 or any other clause, wherein said step of connecting said first end to said second end further comprises a step of overlapping an offset of a bottom frame lip.

33. The method according to clause 12 or any other clause, and further comprising the steps of:

connecting a first end of a panel framework to a second end of a panel framework;

providing a first attachment protrusion at a first edge of said bottom frame lip;

providing a second attachment protrusion at a second opposite edge of bottom frame lip; and joining said first attachment protrusion at said first edge with said second attachment protrusion at said second edge.

34. The method according to clause 5 or 6 or any other clause, and further comprising the steps of:

providing a first attachment protrusion at a first edge of a bottom frame lip;

providing a second attachment protrusion at a second opposite edge of said bottom frame lip; and joining said first attachment protrusion at said first edge with said second attachment protrusion at said second edge.

35. A method for enclosing a panel comprising the steps of:

providing an elongated single piece of panel framework;

bending said elongated single piece of said panel framework around a corner of a rectangular panel to create an about 90-degree angle in said elongated single piece of said panel framework;

placing said bent elongated single piece of panel framework around said corner of said rectangular panel; and creating at least a partial frame around said corner of said rectangular panel with said bent elongated single piece of panel framework.

36. The method according to clause 35 or any other clause, wherein said rectangular panel is chosen from a solar panel, a solar thermal panel, and photovoltaic solar panel.

37. A method for enclosing a panel comprising:

providing an elongated single piece of panel framework having a first end and a second end, wherein said elongated single piece of said panel framework comprises a length of about a perimeter of a rectangular panel;

bending said elongated single piece of said panel framework at three different positions in said elongated single piece of said panel framework to create three about 90-degree angles at each of said positions;

creating a rectangular panel framework from said elongated single piece of panel framework with said three about 90-degree angles;

enclosing said rectangular panel framework around said rectangular panel wherein each of said three 90-degree angles encase a corresponding corner of said rectangular panel; and connecting said first end with said second end of said elongated single piece of said panel framework.

38. A structure comprising.

an elongated single piece of panel framework;

a bend area in said elongated single piece of said panel framework capable of being bent around a corner of a rectangular panel to create an about 90-degree angle in said elongated single piece of said panel framework; and at least a partial frame formed around said corner of said rectangular panel with said bent elongated single piece of panel framework.

As can be easily understood from the foregoing, the basic concepts of the present invention may be embodied in a variety of ways. It involves both framing techniques as well as devices to accomplish the appropriate frame. In this application, the framing techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "bend" should be understood to encompass disclosure of the act of "bending"—whether explicitly discussed or not—and, conversely, were there effectively disclosure of the act of "bending", such a disclosure should be understood to encompass disclosure of a "bend" and even a "means for bending." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed herein or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

US PATENTS

| Cite No | Patent Number | Kind Code | Issue Date | Name of Patentee or Applicant of cited Document |
|---|---|---|---|---|
| 1 | 10/651,783 | B2 | 2020 May 12 | Molitor et al. |

Non-Patent Literature

| | |
|---|---|
| 1 | United States Provisional Patent Application No. 62/921,310 filed Jun. 10, 2019. First named inventor: Patton. |

Thus, the applicant(s) should be understood to have support to claim and make a statement of invention to at least: i) each of the frame devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for attaching photovoltaic solar modules to a surface comprising the steps of:

providing a photovoltaic solar module framework;

providing a fissure in and a frame tab at said photovoltaic solar module framework, the frame tab extending out from the photovoltaic solar module framework adjacent a first side of the fissure;

providing a racking having a racking tab as part of said racking;

aligning said photovoltaic solar module framework with said racking by aligning said fissure with said racking tab;

mating said racking tab of said racking with said fissure such that the frame tab is deflected upon contact with the racking tab and the frame tab is positioned to apply a force on the racking tab in a direction toward a second side of the fissure that is opposite the first side of the fissure; and restricting planar movement of said racking with respect to said photovoltaic solar module framework once said racking tab is mated with said fissure.

2. The method according to claim 1 wherein said step of providing said fissure in said photovoltaic solar module framework comprises a step of providing said fissure in a wall of said photovoltaic solar module framework.

3. The method according to claim 1 wherein said step of providing said fissure in said photovoltaic solar module framework comprises a step of providing said fissure in a bottom frame lip of said photovoltaic solar module framework.

4. The method according to claim 1 wherein said step of providing said racking having said racking tab as part of said racking comprises the step of providing said racking tab on a top of said racking.

5. The method according to claim 1 wherein said step of mating said racking tab with said fissure comprises a step of pushing said racking tab through said fissure.

6. The method according to claim 1 and further comprising deforming said racking tab after mating with said fissure.

7. The method according to claim 1 and further comprising bending said racking tab after mating with said fissure.

8. The method according to claim 1 wherein said racking tab comprises a spring tab.

9. The method according to claim 1 wherein said racking tab comprises a shape chosen from square, rectangular, trapezoidal, tapered, tapered edges, and rounded edges.

10. The method according to claim 1 wherein said step of providing said racking having said racking tab as part of said racking comprises providing said racking having a fixed racking tab as part of said racking.

11. The method according to claim 1 wherein said step of providing said racking having said racking tab as part of said racking comprises providing said racking having an adjustment racking tab as part of said racking.

12. The method according to claim 1 wherein said step of providing said fissure in said photovoltaic solar module framework comprises a step of providing frame holes in said photovoltaic solar module framework.

13. The method according to claim 1 wherein said photovoltaic solar module framework comprises a horizontally folded photovoltaic solar module framework.

14. The method according to claim 1 wherein said step of restricting planar movement of said racking with respect to said photovoltaic solar module framework once said racking tab is mated with said fissure comprises a step of restricting longitudinal movement of said racking with respect to said photovoltaic solar module framework once said racking tab is mated with said fissure.

15. The method according to claim 1, wherein the frame tab extends out from the photovoltaic solar module framework adjacent the first side of the fissure at a skewed angle with respect to the fissure such that at least a portion of the frame tab overhangs the fissure.

16. The method according to claim 1 and further comprising securing said photovoltaic solar module framework to said racking.

17. The method according to claim 16 wherein said step of securing said photovoltaic solar module framework to said racking comprises a step of creating an electrically grounded contact between said racking and said photovoltaic solar module framework.

18. The method according to claim 1 wherein said step of providing said racking having said racking tab as part of said racking comprises a step of providing said racking having a multiple of said racking tabs as part of said racking.

19. The method according to claim 18 wherein said step of providing said racking having a multiple of said racking tabs as part of said racking comprises a step of providing said racking having a multiple different racking tabs as part of said racking.

20. The method according to claim 19 wherein said step of providing said racking having a multiple different racking tabs as part of said racking comprises a step of providing multiple different racking tabs of different shapes.

* * * * *